United States Patent
Li et al.

(10) Patent No.: US 11,451,950 B2
(45) Date of Patent: Sep. 20, 2022

(54) INDIRECT REGISTRATION METHOD AND APPARATUS

(71) Applicant: HUAWEI TECHNOLOGIES CO., LTD., Shenzhen (CN)

(72) Inventors: Meng Li, Beijing (CN); Jiangwei Ying, Beijing (CN); Yanmei Yang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/192,256

(22) Filed: Mar. 4, 2021

(65) Prior Publication Data
US 2021/0195399 A1  Jun. 24, 2021

Related U.S. Application Data

(63) Continuation of application No. PCT/CN2019/104568, filed on Sep. 5, 2019.

(30) Foreign Application Priority Data

Sep. 5, 2018 (CN) .......................... 201811032396.2

(51) Int. Cl.
*H04W 8/06* (2009.01)
*H04W 8/08* (2009.01)
*H04W 8/12* (2009.01)

(52) U.S. Cl.
CPC ........... *H04W 8/065* (2013.01); *H04W 8/082* (2013.01); *H04W 8/12* (2013.01)

(58) Field of Classification Search
CPC ........ H04W 8/065; H04W 8/082; H04W 8/12
(Continued)

(56) References Cited

U.S. PATENT DOCUMENTS

| 10,346,481 B2* | 7/2019 | Chan ...................... G06F 16/125 |
| 2014/0040443 A1* | 2/2014 | Syu ........................ H04W 24/02 |
| | | 709/222 |

(Continued)

FOREIGN PATENT DOCUMENTS

| CN | 107770815 A | 3/2018 |
| CN | 108323245 A | 7/2018 |

(Continued)

OTHER PUBLICATIONS

Samsung: "Solution for the key issue #1 access control for non-publicnetworks", 3GPP Draft; S2-188278, Aug. 14, 2018, XP051537193,3 pages.

(Continued)

*Primary Examiner* — Nghi H Ly
(74) *Attorney, Agent, or Firm* — Rimon PC

(57) ABSTRACT

This application relates to the communications field, and discloses a communication method and a communications apparatus, so that a terminal device can register with a network through another network. The communication method is performed by a first access and mobility management function network element, including: receiving a first message from a terminal device, where the first message includes first identification information of the terminal device, and the first access and mobility management function network element is located in a first network; obtaining second identification information of the terminal device based on the first identification information; and sending a second message to a second access and mobility management function network element located in the second network, where the second message is used to request to register the terminal device with a second network, the second message includes the second identification information.

20 Claims, 21 Drawing Sheets

(58) Field of Classification Search
USPC .......... 455/435.1, 432.1, 436, 442, 422.1
See application file for complete search history.

(56) References Cited

U.S. PATENT DOCUMENTS

2017/0180093 A1* 6/2017 Kemmer ............... H04L 5/0048
2018/0131534 A1* 5/2018 Seelman ............. H04L 12/2809

FOREIGN PATENT DOCUMENTS

| WO | 2017172813 A1 | 10/2017 |
|---|---|---|
| WO | 2018128499 A1 | 7/2018 |
| WO | 2018128529 A1 | 7/2018 |
| WO | 2018138347 A1 | 8/2018 |
| WO | 2018141269 A1 | 8/2018 |

OTHER PUBLICATIONS

Samsung et al: "Update of Solution #4: Support of NPN subscription",3GPP Draft; S2-1813179, Nov. 29, 2018, XP051564424, 6 pages.
Anonymous: "3rd Generation Partnership Project; TechnicalSpecification Group Services and System Aspects; Study on enhancementof 5G System (5GS) for vertical and Local Area Network (LAN) services(Release 16)", 3GPP TR 23.734, V16.2.0, Jun. 11, 2019, XP051753966, 117 pages.
NTT DOCOMO, 23.501: Dual Registration Mobility. SA WG2 Meeting #121, May 15, 2017, Hangzhou, China, S2-173319, 10 pages.
3GPP TS 23.502 V15.2.0:"3rd Generation Partnership Project;Technical Specification Group Services and System Aspects;Procedures for the 5G System;Stage 2(Release 15)",Jun. 1, 2018,total 308 pages.
Huawei, HiSilicon, SMF registeration to HSS+UDM . 3GPP TSG-SA WG2 Meeting #127, Apr. 16, 2018, Sanya, China , S2-183448, 5 pages.
3GPP TS 23.501 V15.2.0:"3rd Generation Partnership Project; Technical Specification Group Services and System Aspects;System Architecture for the 5G System;Stage 2(Release 15)",Jun. 1, 2018,total 216 pages.
OPPO, Clarification on 5G-GUTI in use during Registration procedure. SA WG2 Meeting #128, May 28 Jun. 1, 2018, USA, S2-186845, 10 pages.
Qualcomm Incorporated, Correction to use of identifier in equivalent PLMNs. SA WG2 Meeting #128, Jul. 2, 2018, Vilnius, Lithuania, S2-186443, 10 pages.
Intel, Further corrections to identifiers in Registration procedure. SA WG2 Meeting #128, Jul. 2, 2018, Vilnius, Lithuania, S2-186376, 19 pages.

* cited by examiner

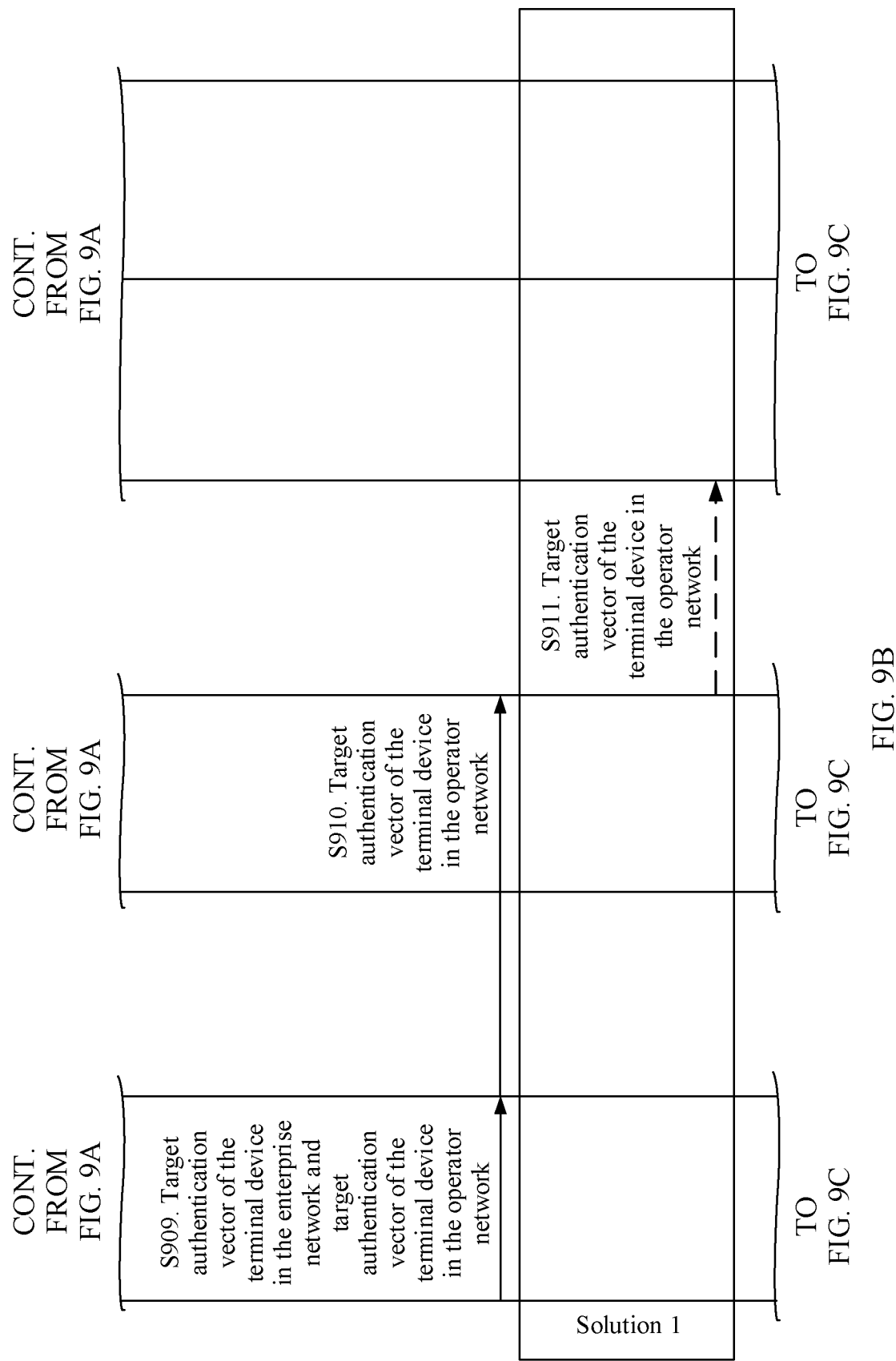

INDIRECT REGISTRATION METHOD AND APPARATUS

CROSS-REFERENCE TO RELATED APPLICATIONS

This application is a continuation of International Application No. PCT/CN2019/104568, filed on Sep. 5, 2019, which claims priority to Chinese Patent Application No. 201811032396.2, filed on Sep. 5, 2018. The disclosures of the aforementioned applications are hereby incorporated by reference in their entireties.

TECHNICAL FIELD

This application relates to the communications field, and in particular, to a communication method and a communications apparatus.

BACKGROUND

To ensure information security and transmission efficiency of an enterprise, the enterprise may establish a wireless enterprise network based on an unlicensed spectrum such as wireless fidelity (Wi-Fi) by using a 5th generation (5G) communications technology, and the wireless enterprise network is used in an office environment and a production environment of the enterprise.

As shown in FIG. 1, independent network function entities (for example, an access and mobility management function (AMF) network element 111, a session management function (SMF) network element 112, and a user plane function (UPF) network element 113 are disposed in an enterprise network 11. The network function entities in the enterprise network 11 and network function entities (for example, an AMF network element 121, an SMF network element 122, and a UPF network element 123) in an operator network 12 form an interconnected two-level network architecture. A terminal device 13 is located within a coverage area of the enterprise network 11, but the terminal device 13 is located outside a coverage area of the operator network 12. In this case, the terminal device 13 may access and register with the enterprise network 11 by using a radio access network RAN) network element 14. In addition, if the terminal device 13 has successfully registered with the operator network 12, and the RAN network element has information about the terminal device 13, the terminal device 13 may further access the operator network 12 through the enterprise network 11.

However, in some scenarios, the terminal device 13 cannot register with the operator network 12. For example, the terminal device 13 is a power meter and cannot move to the coverage area of the operator network 12. As a result, the terminal device 13 cannot successfully access the operator network 12 through the enterprise network 11.

SUMMARY

Embodiments of this application provide a communication method and a communications apparatus, so that a terminal device can register with a network through another network.

To achieve the foregoing objective, the following technical solutions are used in the embodiments of this application.

According to a first aspect, a communication method is provided. The communication method includes: A first access and mobility management function network element receives a first message from a terminal device, where the first message is used to request to register the terminal device with a first network, the first message includes first identification information of the terminal device, the first access and mobility management function network element is located in the first network, and the first identification information is identification information of the terminal device in the first network. The first access and mobility management function network element obtains second identification information of the terminal device based on the first identification information, where the second identification information is identification information of the terminal device in a second network. The first access and mobility management function network element sends a second message to a second access and mobility management function network element, where the second message is used to request to register the terminal device with the second network, the second message includes the second identification information, and the second access and mobility management function network element is located in the second network. According to the communication method provided in this application, the first AMF network element in the first network receives the identification information of the terminal device in the first network from the terminal device, the first AMF network element converts the identification information into the identification information of the terminal device in the second network, and sends the identification information to the second AMF network element in the second network, and the second AMF network element registers the terminal device with the second network based on the identification information of the terminal device in the second network. In this way, the terminal device is registered with the second network through the first network.

In a possible implementation, that the first access and mobility management function network element obtains second identification information of the terminal device based on the first identification information includes: The first access and mobility management function network element obtains, based on a preset correspondence between the first identification information and the second identification information, the second identification information corresponding to the first identification information. This implementation provides a possible implementation in which the first access and mobility management function network element obtains the second identification information of the terminal device based on the first identification information.

In a possible implementation, the communication method further includes: The first access and mobility management function network element obtains subscription information of the terminal device in the first network from a unified data management function network element in the first network, where the subscription information includes the preset correspondence between the first identification information and the second identification information. This implementation provides a manner of obtaining the correspondence between the first identification information and the second identification information.

In a possible implementation, that the first access and mobility management function network element obtains second identification information of the terminal device based on the first identification information includes: The first access and mobility management function network element sends the first identification information to the unified data management function network element in the first network, and receives the second identification information from the unified data management function network element; or the first access and mobility management function network element sends the first identification information to an authentication server function network element in the first network, receives third identification information corresponding to the first identification information from the authentication server function network element, sends the third identification information to the unified data management function network element, and receives the second identification information from the unified data management function network element. This implementation provides another possible implementation in which the first access and mobility management function network element obtains the second identification information of the terminal device based on the first identification information.

In a possible implementation, the first message further includes first indication information, the first indication information is used to indicate whether to register the terminal device with the second network, and that the first access and mobility management function network element sends a second message to a second access and mobility management function network element includes: When the first indication information indicates to register the terminal device with the second network, the first access and mobility management function network element sends the second message to the second access and mobility management function network element. In this implementation, the terminal device can conveniently indicate the first AMF network element whether to register the terminal device with the second network through the first network.

In a possible implementation, the communication method further includes: The first access and mobility management function network element receives a network key of the terminal device in the second network from the second access and mobility management function network element. When the terminal device needs to send a message to the second network through the first network, the first AMF network element performs encryption by using the network key of the terminal device in the second network.

According to a second aspect, a communication method is provided, where the method includes: A second access and mobility management function network element receives a second message from a first access and mobility management function network element, where the first access and mobility management function network element is located in a first network, the second access and mobility management function network element is located in a second network, the second message is used to request to register a terminal device with the second network, the second message includes second identification information of the terminal device, and the second identification information is identification information of the terminal device in the second network. The second access and mobility management function network element registers the terminal device with the second network based on the second identification information. According to the communication method provided in this application, the first AMF network element in the first network receives identification information of the terminal device in the first network from the terminal device, the first AMF network element converts the identification information into the identification information of the terminal device in the second network, and sends the identification information to the second AMF network element in the second network, and the second AMF network element registers the terminal device with the second network based on the identification information of the terminal device in the second network. In this way, the terminal device is registered with the second network through the first network.

In a possible implementation, the communication method further includes: The second access and mobility management function network element obtains first identification information of the terminal device based on the second identification information, where the first identification information is the identification information of the terminal device in the first network. The second access and mobility management function network element sends the first identification information to the first access and mobility management function network element. This implementation provides a possible implementation in which the first access and mobility management function network element obtains the second identification information of the terminal device based on the first identification information.

In a possible implementation, that the second access and mobility management function network element obtains first identification information of the terminal device based on the second identification information includes: The second access and mobility management function network element obtains, based on a preset correspondence between the first identification information and the second identification information, the first identification information corresponding to the second identification information. This implementation provides a possible implementation in which the second access and mobility management function network element obtains the first identification information of the terminal device based on the second identification information.

In a possible implementation, the communication method further includes: The second access and mobility management function network element obtains subscription information of the terminal device in the second network from a unified data management function network element in the second network, where the subscription information includes the preset correspondence between the first identification information and the second identification information. This implementation provides a manner of obtaining the correspondence between the first identification information and the second identification information.

In a possible implementation, that the second access and mobility management function network element obtains first identification information of the terminal device based on the second identification information includes: The second access and mobility management function network element sends the second identification information to the unified data management function network element in the second network, and receives the first identification information from the unified data management function network element; or the second access and mobility management function network element sends the second identification information to an authentication server function network element in the second network, receives fourth identification information corresponding to the second identification information from the authentication server function network element, sends the fourth identification information to the unified data management function network element, and receives the first identification information from the unified data management function network element. This implementation provides another possible implementation in which the second access and mobility management function network element obtains the first identification information of the terminal device based on the second identification information.

According to a third aspect, a communication method is provided, where the method includes: A first access and mobility management function network element receives a first message from a terminal device, where the first access and mobility management function network element is located in a first network, the first message includes second identification information of the terminal device, and the second identification information is identification information of the terminal device in a second network. The first access and mobility management function network element sends a second message to a second access and mobility management function network element, where the second message is used to request to register the terminal device with the second network, the second message includes the second identification information, and the second access and mobility management function network element is located in the second network. According to the communication method provided in this embodiment of this application, the first AMF network element in the first network receives the identification information of the terminal device in the second network from the terminal device, and sends the identification information to the second AMF network element in the second network, and the second AMF network element registers the terminal device with the second network based on the identification information of the terminal device in the second network. In this way, the terminal device is registered with the second network through the first network.

In a possible implementation, the communication method further includes: The first access and mobility management function network element receives a network key of the terminal device in the second network from the second access and mobility management function network element.

In a possible implementation, the communication method further includes: The first access and mobility management function network element receives first identification information of the terminal device from the second access and mobility management function network element, where the first identification information is identification information of the terminal device in the first network. The first access and mobility management function network element registers the terminal device with the first network based on the first identification information.

According to a fourth aspect, a communication method is provided, where the method includes: A first access and mobility management function network element receives a first registration message of a terminal device from the terminal device, where the first access and mobility management function network element is located in a first network, and the first registration message is used to request to register the terminal device with the first network. The first access and mobility management function network element sends a second registration message to a second access and mobility management function network element based on the first registration message, where the second access and mobility management function network element is located in a second network, and the second registration message is used to request to register the terminal device with the second network. According to the communication method provided in this application, the first AMF network element in the first network receives the first registration message of the terminal device from the terminal device, and the first AMF network element performs registration with the second AMF network element in the second network based on the first registration message. In this way, the terminal device is registered with the second network through the first network.

In a possible implementation, that the first access and mobility management function network element sends the second registration message to a second access and mobility management function network element based on the first registration message includes: When the first registration message carries first indication information, and the first indication information is used to indicate to register the terminal device with the second network, the first access and mobility management function network element sends the second registration message to the second access and mobility management function network element; or when the first registration message carries identification information of the terminal device in the second network, the first access and mobility management function network element sends the second registration message to the second access and mobility management function network element; or when the first registration message carries network identification information, and the network identification information is used to identify the second network, the first access and mobility management function network element sends the second registration message to the second access and mobility management function network element. This implementation provides several possible implementations in which the first access and mobility management function network element sends the second registration message to the second access and mobility management function network element based on the first registration message.

According to a fifth aspect, a communication method is provided, where the method includes: A first access and mobility management function network element receives first identification information and second identification information of a terminal device from the terminal device, where the first identification information is identification information of the terminal device in a first network, the second identification information is identification information of the terminal device in a second network, and the first access and mobility management function network element is located in the first network. The first access and mobility management function network element sends the first identification information to an authentication server function network element in the first network, where the first identification information is used to generate an authentication vector of the terminal device in the first network. The first access and mobility management function network element receives the authentication vector of the terminal device in the first network from the authentication server function network element. The first access and mobility management function network element sends the second identification information to a second access and mobility management function network element, where the second identification information is used to generate an authentication vector of the terminal device in the second network, and the second access and mobility management function network element is located in the second network. The first access and mobility management function network element receives the authentication vector of the terminal device in the second network from the second access and mobility management function network element. The first access and mobility management function network element sends the authentication vector of the terminal device in the first network and the authentication vector of the terminal device in the second network to the terminal device. According to the communication method provided in this application, the first AMF network element in the first network receives the identification information of the terminal device in the first network and the identification information of the terminal device in the second network from the terminal device, and the first AMF network element obtains the authentication vector of the terminal device in the first network based on the identification information of the terminal device in the first network. The first AMF network element sends the identification information of the terminal device in the second network to the second AMF network element in the second network, to obtain the authentication vector of the terminal device in the second network. Further, the first AMF network element sends the authentication vector of the terminal device in the first network and the authentication vector of the terminal device in the second network to the terminal device, for the terminal device to perform authentication on the first network and the second network, so that the terminal device further performs authentication on the first network and the second network. In addition, the first AMF network element in the first network may send the authentication vector of the terminal device in the first network and the authentication vector of the terminal device in the second network to the terminal device by using one message. This avoids sending the authentication vectors by using two messages, thereby reducing resource consumption of an air interface.

In a possible implementation, the first identification information includes a public land mobile network identifier of the first network, and the communication method further includes: The first access and mobility management function network element sends the public land mobile network identifier of the first network to the second access and mobility management function network element, where the public land mobile network identifier of the first network is used to generate the authentication vector of the terminal device in the second network. This implementation provides a possible implementation of generating the authentication vector of the terminal device in the second network.

In a possible implementation, the first access and mobility management function network element receives a target authentication vector of the terminal device in the first network and a target authentication vector of the terminal device in the second network from the terminal device, and the first access and mobility management function network element sends the target authentication vector of the terminal device in the second network to the second access and mobility management function network element. In this implementation, the terminal device sends the target authentication vector of the terminal device in the first network and the target authentication vector of the terminal device in the second network to the first AMF network element, so that the first network and the second network may perform authentication on the terminal device. In addition, the terminal device may send the target authentication vector of the terminal device in the first network and the target authentication vector of the terminal device in the second network to the first AMF network element by using one message. This avoids sending the target authentication vectors by using two messages, thereby reducing resource consumption of an air interface.

In a possible implementation, the communication method further includes: The first access and mobility management function network element receives a network key of the terminal device from the second access and mobility management function network element. The network key may be used for security protection for both a message or data between the terminal device and the first network and a message or data between the terminal device and the second network.

According to a sixth aspect, a communication method is provided, where the method includes: A second access and mobility management function network element receives second identification information of a terminal device from a first access and mobility management function network element, where the first access and mobility management function network element is located in a first network, the second access and mobility management function network element is located in a second network, and the second identification information is identification information of the terminal device in the second network. The second access and mobility management function network element sends the second identification information to an authentication server function network element in the second network, where the second identification information is used to generate an authentication vector of the terminal device in the second network. The second access and mobility management function network element receives the authentication vector of the terminal device in the second network from the authentication server function network element. The second access and mobility management function network element sends the authentication vector of the terminal device in the second network to the first access and mobility management function network element. According to the communication method provided in this application, the first AMF network element in the first network receives identification information of the terminal device in the first network and the identification information of the terminal device in the second network from the terminal device, and the first AMF network element obtains an authentication vector of the terminal device in the first network based on the identification information of the terminal device in the first network. The first AMF network element sends the identification information of the terminal device in the second network to the second AMF network element in the second network, to obtain the authentication vector of the terminal device in the second network. Further, the first AMF network element sends the authentication vector of the terminal device in the first network and the authentication vector of the terminal device in the second network to the terminal device, for the terminal device to perform authentication on the first network and the second network, so that the terminal device further performs authentication on the first network and the second network. In addition, the first AMF network element in the first network may send the authentication vector of the terminal device in the first network and the authentication vector of the terminal device in the second network to the terminal device by using one message. This avoids sending the authentication vectors by using two messages, thereby reducing resource consumption of an air interface.

In a possible implementation, the communication method further includes: The second access and mobility management function network element receives a public land mobile network identifier of the first network from the first access and mobility management function network element. The second access and mobility management function network element sends the public land mobile network identifier of the first network to the authentication server function network element, where the public land mobile network identifier of the first network is used to generate the authentication vector of the terminal device in the second network. This implementation provides a possible implementation of generating the authentication vector of the terminal device in the second network.

According to a seventh aspect, a communications apparatus is provided. The communications apparatus is located in a first network. The communications apparatus includes: a receiving unit, configured to receive a first message from a terminal device, where the first message is used to request to register the terminal device with the first network, the first message includes first identification information of the terminal device, and the first identification information is identification information of the terminal device in the first network; an obtaining unit, configured to obtain second identification information of the terminal device based on the first identification information, where the second identification information is identification information of the terminal device in a second network; and a sending unit, configured to send a second message to a second access and mobility management function network element, where the second message is used to request to register the terminal device with the second network, the second message includes the second identification information, and the second access and mobility management function network element is located in the second network.

In a possible implementation, the obtaining unit is specifically configured to obtain, based on a preset correspondence between the first identification information and the second identification information, the second identification information corresponding to the first identification information.

In a possible implementation, the obtaining unit is further configured to obtain subscription information of the terminal device in the first network from a unified data management function network element in the first network, where the subscription information includes the preset correspondence between the first identification information and the second identification information.

In a possible implementation, the sending unit is further configured to send the first identification information to the unified data management function network element in the first network, and the receiving unit is further configured to receive the second identification information from the unified data management function network element; or the sending unit is further configured to send the first identification information to an authentication server function network element in the first network, the receiving unit is further configured to receive third identification information corresponding to the first identification information from the authentication server function network element, the sending unit is further configured to send the third identification information to the unified data management function network element, and the receiving unit is further configured to receive the second identification information from the unified data management function network element.

In a possible implementation, the first message further includes first indication information, the first indication information is used to indicate whether to register the terminal device with the second network, and the sending unit is specifically configured to: when the first indication information indicates to register the terminal device with the second network, send the second message to the second access and mobility management function network element.

In a possible implementation, the receiving unit is further configured to receive a network key of the terminal device in the second network from the second access and mobility management function network element.

According to an eighth aspect, a communications apparatus is provided. The communications apparatus is located in a second network. The communications apparatus includes: a receiving unit, configured to receive a second message from a first access and mobility management function network element, where the first access and mobility management function network element is located in a first network, the second message is used to request to register a terminal device with the second network, the second message includes second identification information of the terminal device, and the second identification information is identification information of the terminal device in the second network; and a registration unit, configured to register the terminal device with the second network based on the second identification information of the terminal device.

In a possible implementation, the communications apparatus further includes an obtaining unit and a sending unit. The obtaining unit is configured to obtain first identification information of the terminal device based on the second identification information, where the first identification information is identification information of the terminal device in the first network. The sending unit is configured to send the first identification information to the first access and mobility management function network element.

In a possible implementation, the obtaining unit is specifically configured to obtain, based on a preset correspondence between the first identification information and the second identification information, the first identification information corresponding to the second identification information.

In a possible implementation, the obtaining unit is further configured to obtain subscription information of the terminal device in the second network from a unified data management function network element in the second network, where the subscription information includes the preset correspondence between the first identification information and the second identification information.

In a possible implementation, the sending unit is further configured to send the second identification information to the unified data management function network element in the second network, and the receiving unit is further configured to receive the first identification information from the unified data management function network element; or the sending unit is further configured to send the second identification information to an authentication server function network element in the second network, the receiving unit is further configured to receive fourth identification information corresponding to the second identification information from the authentication server function network element, the sending unit is further configured to send the fourth identification information to the unified data management function network element, and the receiving unit is further configured to receive the first identification information from the unified data management function network element.

According to a ninth aspect, a communications apparatus is provided. The communications apparatus is located in a first network. The communications apparatus includes: a receiving unit, configured to receive a first message from a terminal device, where the first message includes second identification information of the terminal device, and the second identification information is identification information of the terminal device in a second network; and a sending unit, configured to send a second message to a second access and mobility management function network element, where the second message is used to request to register the terminal device with the second network, the second message includes the second identification information, and the second access and mobility management function network element is located in the second network.

In a possible implementation, the receiving unit is further configured to receive a network key of the terminal device in the second network from the second access and mobility management function network element.

In a possible implementation, the communications apparatus further includes a registration unit. The receiving unit is further configured to receive first identification information of the terminal device from the second access and mobility management function network element, where the first identification information is identification information of the terminal device in the first network. The registration unit is configured to register the terminal device with the first network based on the first identification information.

According to a tenth aspect, a communications apparatus is provided. The communications apparatus is located in a first network. The communications apparatus includes: a receiving unit, configured to receive a first registration message of a terminal device from the terminal device, where the first registration message is used to request to register the terminal device with the first network; and a sending unit, configured to send a second registration message to a second access and mobility management function network element based on the first registration message, where the second access and mobility management function network element is located in a second network, and the second registration message is used to request to register the terminal device with the second network.

In a possible implementation, the sending unit is specifically configured to: when the first registration message carries first indication information, and the first indication information is used to indicate to register the terminal device with the second network, send the second registration message to the second access and mobility management function network element; or when the first registration message carries identification information of the terminal device in the second network, send the second registration message to the second access and mobility management function network element; or when the first registration message carries network identification information, and the network identification information is used to identify the second network, send the second registration message to the second access and mobility management function network element.

According to an eleventh aspect, a communications apparatus is provided. The communications apparatus is located in a first network. The communications apparatus includes: a receiving unit, configured to receive first identification information and second identification information of a terminal device from the terminal device, where the first identification information is identification information of the terminal device in the first network, and the second identification information is identification information of the terminal device in a second network; and a sending unit, configured to send the first identification information to an authentication server function network element in the first network, where the first identification information is used to generate an authentication vector of the terminal device in the first network. The receiving unit is further configured to receive the authentication vector of the terminal device in the first network from the authentication server function network element. The sending unit is further configured to send the second identification information to a second access and mobility management function network element, where the second identification information is used to generate an authentication vector of the terminal device in the second network, and the second access and mobility management function network element is located in the second network. The receiving unit is further configured to receive the authentication vector of the terminal device in the second network from the second access and mobility management function network element. The sending unit is further configured to send the authentication vector of the terminal device in the first network and the authentication vector of the terminal device in the second network to the terminal device.

In a possible implementation, the first identification information includes a public land mobile network identifier of the first network, and the sending unit is further configured to send the public land mobile network identifier of the first network to the second access and mobility management function network element, where the public land mobile network identifier of the first network is used to generate the authentication vector of the terminal device in the second network.

In a possible implementation, the receiving unit is further configured to receive a target authentication vector of the terminal device in the first network and a target authentication vector of the terminal device in the second network from the terminal device, and the sending unit is further configured to send the target authentication vector of the terminal device in the second network to the second access and mobility management function network element.

In a possible implementation, the receiving unit is further configured to receive a network key of the terminal device from the second access and mobility management function network element.

According to a twelfth aspect, a communications apparatus is provided. The communications apparatus is located in a second network. The communications apparatus includes: a receiving unit, configured to receive second identification information of a terminal device from a first access and mobility management function network element, where the first access and mobility management function network element is located in a first network, and the second identification information is identification information of the terminal device in the second network; and a sending unit, configured to send the second identification information to an authentication server function network element in the second network, where the second identification information is used to generate an authentication vector of the terminal device in the second network. The receiving unit is further configured to receive the authentication vector of the terminal device in the second network from the authentication server function network element. The sending unit is further configured to send the authentication vector of the terminal device in the second network to the first access and mobility management function network element.

In a possible implementation, the receiving unit is further configured to receive a public land mobile network identifier of the first network from the first access and mobility management function network element, and the sending unit is further configured to send the public land mobile network identifier of the first network to the authentication server function network element, where the public land mobile network identifier of the first network is used to generate the authentication vector of the terminal device in the second network.

According to a thirteenth aspect, an embodiment of this application provides a communications system, including the communications apparatus according to the seventh aspect and the communications apparatus according to the eighth aspect, or including the communications apparatus according to the ninth aspect, or including the communications apparatus according to the tenth aspect, or including the communications apparatus according to the eleventh aspect and the communications apparatus according to the twelfth aspect.

According to a fourteenth aspect, an embodiment of this application provides a communications apparatus, including a processor and a memory. The memory is configured to store a program, and the processor invokes the program stored in the memory, to perform the communication method according to the first aspect and the possible implementations of the first aspect, or perform the communication method according to the second aspect and the possible implementations of the second aspect, or perform the communication method according to the third aspect and the possible implementations of the third aspect, or perform the communication method according to the fourth aspect and the possible implementations of the fourth aspect, or perform the communication method according to the fifth aspect and the possible implementations of the fifth aspect, or perform the communication method according to the sixth aspect and the possible implementations of the sixth aspect.

According to a fifteenth aspect, an embodiment of this application provides a storage medium. The storage medium stores a computer program. When the computer program is executed by a processor, the communication method according to the first aspect and the possible implementations of the first aspect is performed, or the communication method according to the second aspect and the possible implementations of the second aspect is performed, or the communication method according to the third aspect and the possible implementations of the third aspect is performed, or the communication method according to the fourth aspect and the possible implementations of the fourth aspect is performed, or the communication method according to the fifth aspect and the possible implementations of the fifth aspect is performed, or the communication method according to the sixth aspect and the possible implementations of the sixth aspect is performed.

According to a sixteenth aspect, an embodiment of this application provides a computer program product. When the computer program product runs on a communications apparatus, the communications apparatus is enabled to perform the communication method according to the first aspect and the possible implementations of the first aspect, or perform the communication method according to the second aspect and the possible implementations of the second aspect, or perform the communication method according to the third aspect and the possible implementations of the third aspect, or perform the communication method according to the fourth aspect and the possible implementations of the fourth aspect, or perform the communication method according to the fifth aspect and the possible implementations of the fifth aspect, or perform the communication method according to the sixth aspect and the possible implementations of the sixth aspect.

According to a seventeenth aspect, an embodiment of this application provides a chip system, including a processor, configured to support a communications apparatus in performing the communication method according to the first aspect and the possible implementations of the first aspect, or performing the communication method according to the second aspect and the possible implementations of the second aspect, or performing the communication method according to the third aspect and the possible implementations of the third aspect, or performing the communication method according to the fourth aspect and the possible implementations of the fourth aspect, or performing the communication method according to the fifth aspect and the possible implementations of the fifth aspect, or performing the communication method according to the sixth aspect and the possible implementations of the sixth aspect.

For technical effects of the possible implementations of the seventh aspect to the seventeenth aspect, refer to the content described in the first aspect to the sixth aspect.

BRIEF DESCRIPTION OF DRAWINGS

FIG. 6A-1 and FIG. 6A-2 are two parts of a schematic flowchart of a communication method according to an embodiment of this application;

FIG. 9A to FIG. 9C are a schematic flowchart of a communication method according to an embodiment of this application;

DESCRIPTION OF EMBODIMENTS

In embodiments of this application, a 5G network is used as an example of a wireless communications network for description. It should be noted that a method and an apparatus in the embodiment of this application may be further used in another wireless communications network, for example, 4G or a future communications system. Correspondingly, a network element name, a message name, or the like may also be replaced with a name of a corresponding function in the other wireless communications network.

Figure 2:
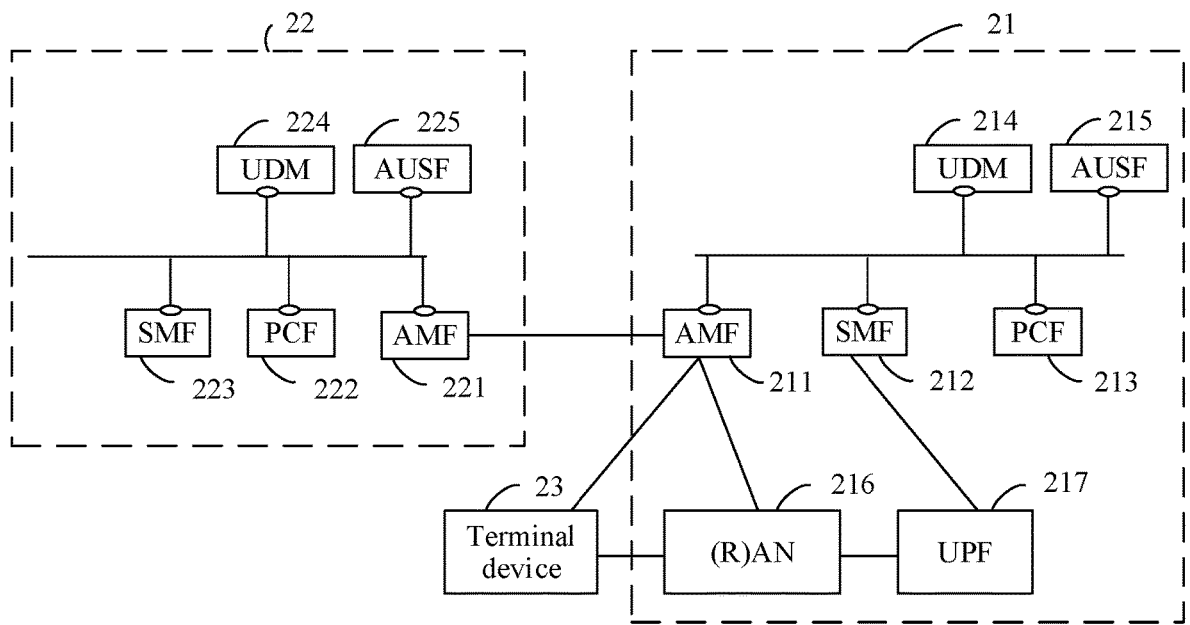
FIG. 2 is a schematic architectural diagram 2 of a communications system.

FIG. 2 is a schematic architectural diagram of a communications system. All communication methods in this application may be used in the communications system. The communications system may include an enterprise network 21, an operator network 22, and a terminal device 23.

The enterprise network may also be referred to as a serving network, a visit network, a private network, or the like. The operator network may also be referred to as a homing network, a home network, a public network, or the like.

The enterprise network 21 includes an access and mobility management function (AMF) network element 211, a visit session management function (SMF) network element 212, a policy control function (PCF) network element 213, a user data management function (UDM) network element 214, an authentication server function (AUSF) 215, a (radio) access network ((R)AN) network element 216, and a user plane function (UPF) network element 217.

The operator network 22 includes an AMF network element 221, an SMF network element 223, a PCF network element 222, a UDM network element 224, and an AUSF network element 225.

The terminal device 23 includes various devices with a wireless communication function, for example, a handheld device, an in-vehicle device, a wearable device, a computing device, or another processing device connected to a wireless modem; or may include a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, user equipment (UE), a mobile station (MS), a terminal device, relay equipment, or the like. For example, the relay equipment may be a 5G residential gateway (RG) or a radio relay.

It should be noted that same network elements in the enterprise network 21 and the operator network 22 may have a same or similar function. For example, the AMF network element 211 and the AMF network element 221 have a same function, and the SMF network element 212 and the SMF network element 222 have a same function. The following describes functions of the foregoing network elements.

Main functions of the AMF network element include mobility management, lawful interception, access authorization and authentication, and the like.

Main functions of the SMF network element include session management, internet protocol (IP) address allocation and management for a terminal device, selection and management of a user plane function network element, downlink data notification, and the like.

The PCF network element is configured to provide a unified policy framework, generate a network processing policy based on subscription information, and provide the network processing policy for a corresponding control plane network element to execute.

The UDM network element is configured to provide unified data management, and provide services such as storing and querying subscription and security related data of a terminal device, and storing mobility related data such as session and service information (for example, an AMF network element corresponding to a session).

The AUSF network element is used for user authentication and the like.

The UPF network element is configured to route and forward packet data, perform quality of service (QoS) processing on user plane data, and the like.

The RAN network element is configured to provide network resources for access of a terminal device, and is responsible for functions such as radio resource management, uplink and downlink data classification and QoS application, performing signaling processing with a control plane network element, and performing data forwarding with a user plane network element.

The AMF network element, the SMF network element, the UDM network element, the AUSF network element, the PCF network element, and the UPF network element shown in FIG. 2 may be collectively referred to as a core network device.

It should be noted that names of the network elements in the figure do not constitute a limitation on the device. In a 5G network and another future network, the foregoing network elements may also have other names. This is not specifically limited in this embodiment of this application. For example, the UDM network element may be alternatively replaced with a home subscriber server (HSS), a user subscription database (USD), or a database entity. This is uniformly described herein, and details are not described below again.

Figure 3:
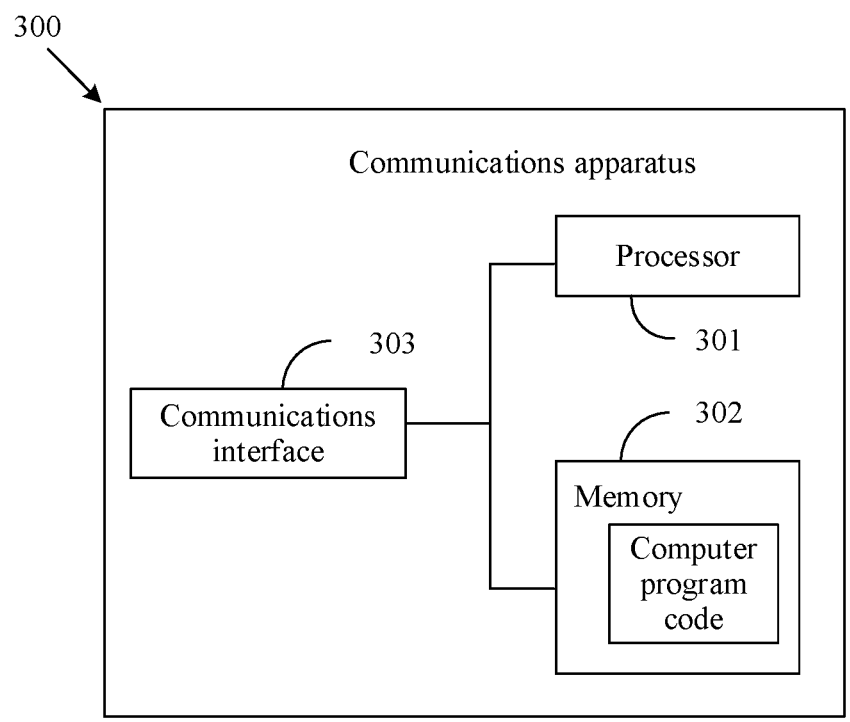
FIG. 3 is a schematic structural diagram of a communications apparatus according to an embodiment of this application.

As shown in FIG. 3, an embodiment of this application provides a schematic structural diagram of a communications apparatus. The communications apparatus 300 may be a core network device, or may be a chip or a system-on-a-chip located in a core network device. The communications apparatus 300 may be a terminal device, or may be a chip or a system-on-a-chip located in a terminal device. This is not limited. The communications apparatus 300 may include at least one processor 301 and at least one memory 302. The at least one processor 301 and the at least one memory 302 may be connected by using a bus.

The memory 302 is configured to store computer program code.

The processor 301 is configured to invoke the computer program code stored in the memory 302, to perform a function of a core network device in the following method embodiments, for example, a function of an AMF network element, an SMF network element, an AUSF network element, or a UDM network element.

Optionally, the communications apparatus further includes at least one communications interface 303.

The communications interface 303 is configured to communicate with a RAN network element or a core network device. The communications interface 303 may perform communication in a wired or wireless manner.

Figure 4:
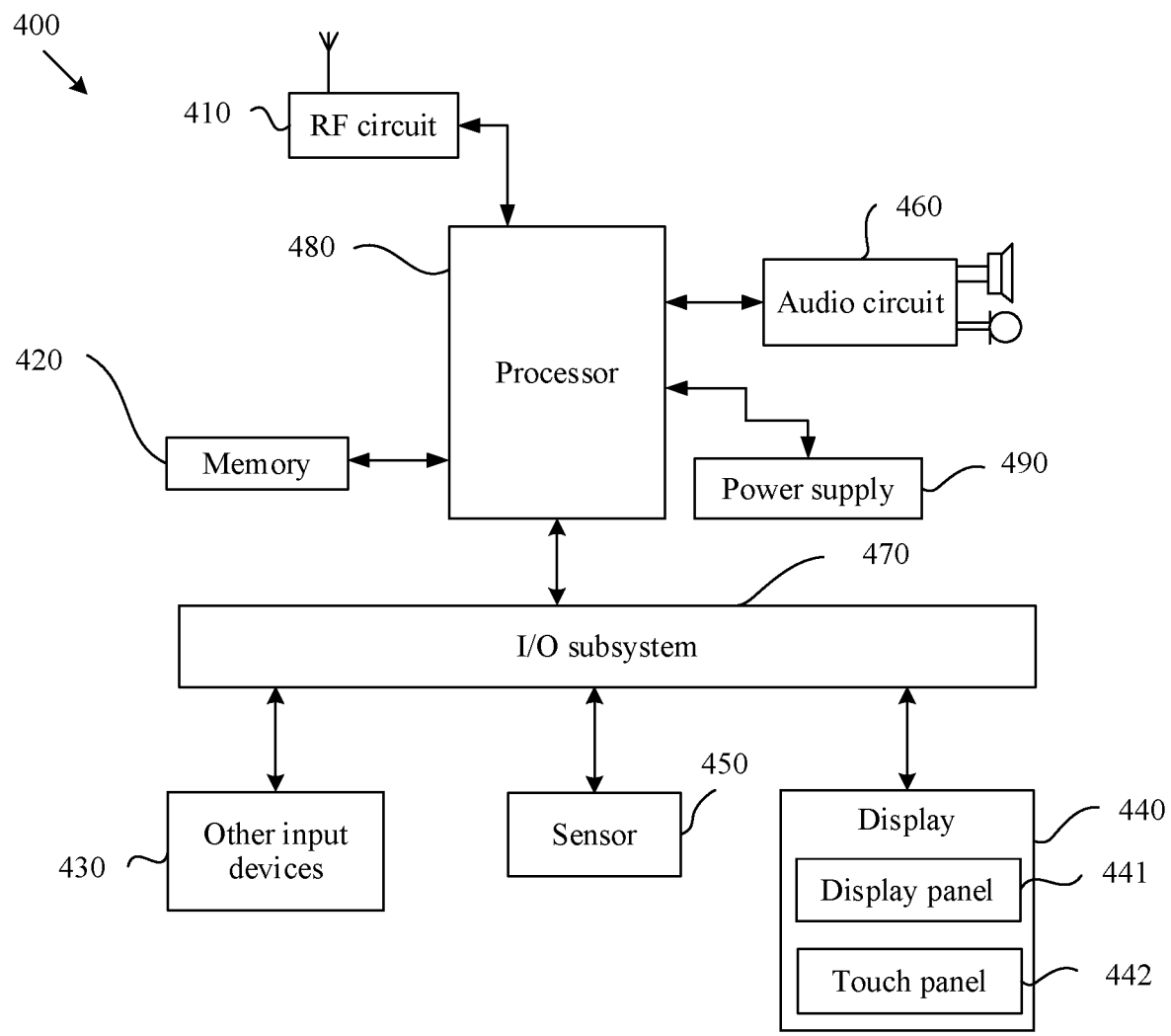
FIG. 4 is a schematic structural diagram of a terminal device according to an embodiment of this application.

As shown in FIG. 4, an embodiment of this application provides a schematic structural diagram of a terminal device. In FIG. 4, for example, the terminal device is a mobile phone, and a general hardware architecture of the mobile phone is described.

The mobile phone 400 may include components such as a radio frequency (RF) circuit 410, a memory 420, other input devices 430, a display 440, a sensor 450, an audio circuit 460, an I/O subsystem 470, a processor 480, and a power supply 490. A person skilled in the art can understand that a structure of the mobile phone shown in the figure does not constitute a limitation on the mobile phone, and the mobile phone may include more or fewer components than those shown in the figure, or some components may be combined, or some components may be split, or there may be a different component layout. A person skilled in the art can understand that the display 440 belongs to a user interface (UI), and the display 440 may include a display panel 441 and a touch panel 442. Although not shown, the mobile phone may further include functional modules or devices such as a camera and a Bluetooth module. Details are not described herein.

Further, the processor 480 is separately connected to the RF circuit 410, the memory 420, the audio circuit 460, the I/O subsystem 470, and the power supply 490. The I/O subsystem 470 is separately connected to the other input devices 430, the display 440, and the sensor 450. The RF circuit 410 may be configured to send or receive a signal in an information sending/receiving or call process, and in particular, receive downlink information from a network side and send the downlink information to the processor 480 for processing. The memory 420 may be configured to store a software program and a module. The processor 480 runs the software program and the module stored in the memory 420, to perform various functional applications and data processing of the mobile phone, for example, perform a method and a function of the terminal device in this embodiment of this application. The other input devices 430 may be configured to receive entered numerical or character information, and generate key signal input related to a user setting and function control of the mobile phone. The display 440 may be configured to display information entered by a user or information provided for a user, and various menus of the mobile phone, and may further receive input from the user. The sensor 450 may be an optical sensor, a motion sensor, or another sensor. The audio circuit 460 may provide an audio interface between the user and the mobile phone. The I/O subsystem 470 is configured to control external devices used for input and output. The external devices may include other device input controllers, a sensor controller, and a display controller. The processor 480 is a control center of the mobile phone 400, connects various parts of the entire mobile phone by using various interfaces and lines, and performs various functions and data processing of the mobile phone 400 by running or executing the software program and/or the module stored in the memory 420 and invoking data stored in the memory 420, to perform overall monitoring on the mobile phone. The power supply 490 (for example, a battery) is configured to supply power to the foregoing components. Preferably, the power supply may be logically connected to the processor 480 by using a power management system, to implement functions such as charging management, discharging management, and power consumption management by using the power management system.

The following describes terms used in the embodiments of this application.

A first network may be an operator network, an enterprise network, a private network, a public network, a local public land mobile network, a remote public land mobile network, a network currently selected by a user for access, a network additionally accessed by a user, a home network of a user, a visited network of a user, a subscribed network of a user, a roaming network of a user, a network temporarily accessed by a user, or a network to which a user subscribes.

A second network may be an operator network, an enterprise network, a private network, a public network, a local public land mobile network, a remote public land mobile network, a network currently selected for access, an additionally accessed network, a home network of a user, a visited network of a user, a subscribed network of a user, a roaming network of a user, a network temporarily accessed by a user, or a network to which a user subscribes.

It should be noted that the second network and the first network are independent of each other. For example, the first network is an enterprise network, and the second network is an operator network; or the first network is a private network, and the second network is a public network; or the first network is a local public land mobile network, and the second network is a remote public land mobile network; or the first network is a network currently selected by a user for access, and the second network is a network additionally accessed by the user; or the first network is a home network of a user, and the second network is a visited network of the user; or the first network is a subscribed network of a user, and the second network is a roaming network of the user; or the first network is a network temporarily accessed by a user, and the second network is a network to which the user subscribes. For another example, the first network is an operator network, and the second network is an enterprise network; or the first network is a public network, and the second network is a private network; or the first network is a remote public land mobile network, and the second network is a local public land mobile network; or the first network is a network additionally accessed by a user, and the second network is a network currently selected by the user for access; or the first network is a visited network of a user, and the second network is a home network of the user; or the first network is a roaming network of a user, and the second network is a subscribed network of the user; or the first network is a network to which a user subscribes, and the second network is a network temporarily accessed by the user.

In the embodiments of this application, for example, the first network is an enterprise network, and the second network is an operator network, but this is not intended to require that same terms be used. For example, the embodiments are also applicable to a scenario in which the first network is a home network and the second network is a visited network.

First identification information is identification information of a terminal device in the first network, and may be used to identify the terminal device in the first network. Specifically, the first identification information may be an identifier allocated by the first network to the terminal device. For example, the first identification information may be a subscription concealed identifier (SUCI) of the terminal device in the first network; or the first identification information may be a subscription permanent identifier (SUPI) of the terminal device in the first network; or the first identification information may be a 5G globally unique temporary identifier (5G-GUTI) of the terminal device in the first network.

Second identification information is identification information of the terminal device in the second network, and may be used to identify the terminal device in the second network.

Specifically, the second identification information may be an identifier allocated by the second network to the terminal device. For example, the second identification information may be an SUCI of the terminal device in the second network; or the second identification information may be an SUPI of the terminal device in the second network; or the second identification information may be a 5G-GUTI of the terminal device in the second network.

This application provides a communication method. The communication method includes: A first AMF network element in a first network receives identification information of a terminal device in the first network from the terminal device. The first AMF network element converts the identification information into identification information of the terminal device in a second network, and sends the identification information to a second AMF network element in the second network, so that the terminal device is registered with the second network through the first network.

Figure 5A:
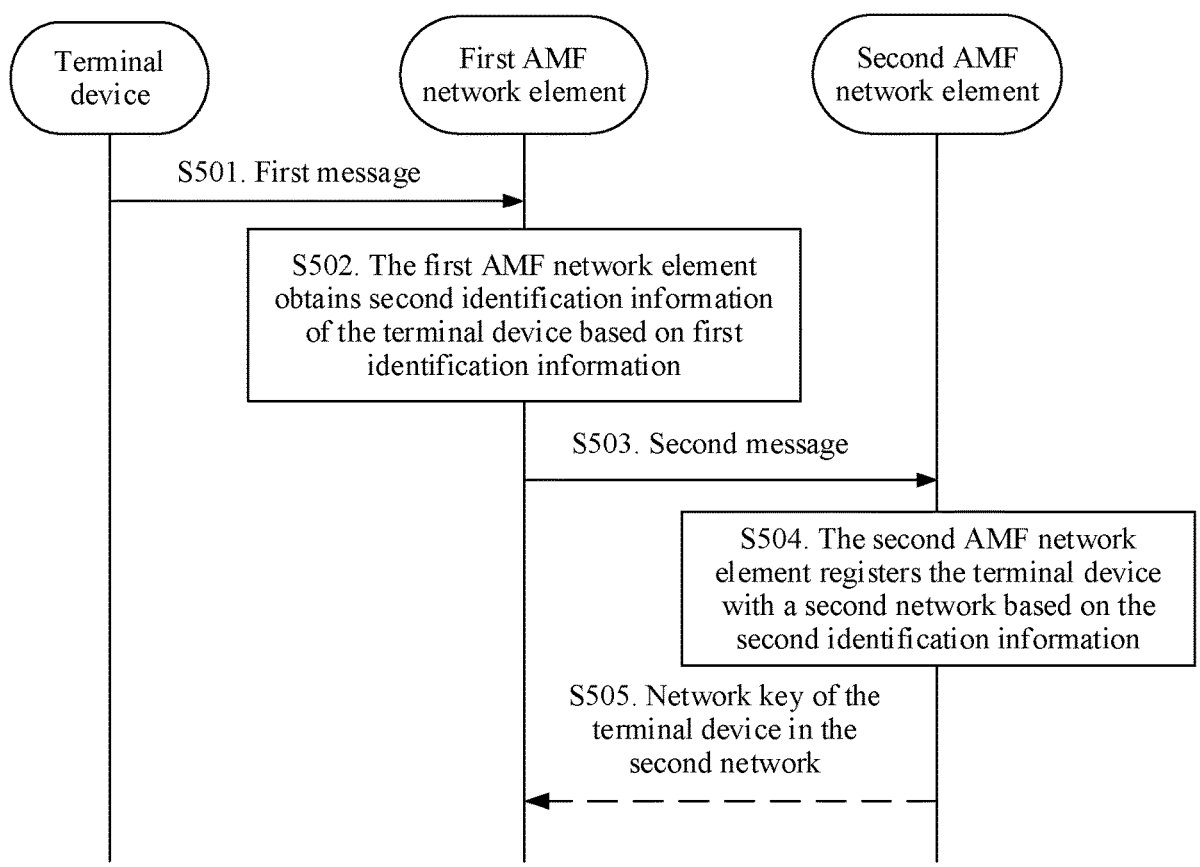
FIG. 5A is a schematic flowchart of a communication method according to an embodiment of this application.

Referring to FIG. 5A, this application provides a communication method. Details are as follows.

S501. A terminal device sends a first message to a first AMF network element.

Correspondingly, the first AMF network element receives the first message from the terminal device. The first AMF network element is located in a first network.

The first message may be used to request to register the terminal device with the first network, and the first message may be a registration request message. This is not limited.

In addition, the first message includes first identification information of the terminal device.

S502. The first AMF network element obtains second identification information of the terminal device based on the first identification information.

In a possible implementation, the first AMF network element may obtain, based on a preset correspondence between the first identification information and the second identification information, the second identification information corresponding to the first identification information. For example, the preset correspondence between the first identification information and the second identification information may be preconfigured on the first AMF network element; or the first AMF network element may obtain subscription information of the terminal device in the first network from a UDM network element in the first network, where the subscription information includes the preset correspondence between the first identification information and the second identification information. The first AMF network element may search for the correspondence by using the first identification information, to obtain the second identification information.

In another possible implementation, the first AMF network element may send the first identification information to the UDM network element in the first network, and receive the second identification information from the UDM network element. For example, the second identification information may be carried in the subscription information of the terminal device in the first network.

In still another possible implementation, the first AMF network element may send the first identification information to an AUSF network element in the first network; the first AMF network element receives third identification information corresponding to the first identification information from the AUSF network element, where the third identification information is another piece of identification information, corresponding to the first identification information, of the terminal device in the first network; the first AMF network element sends the third identification information to the UDM network element in the first network; and the first AMF network element receives the second identification information from the UDM network element. For example, the second identification information may be carried in the subscription information of the terminal device in the first network.

For example, the third identification information may be an SUPI of the terminal device in the first network; or the third identification information may be a 5G-GUTI of the terminal device in the first network.

S503. The first AMF network element sends a second message to a second AMF network element.

Correspondingly, the second AMF network element receives the second message from the first AMF network element. The second AMF network element is located in a second network.

The second message may be used to request to register the terminal device with the second network. For example, the second message is a registration request message.

In addition, the second message includes the second identification information of the terminal device.

S504. The second AMF network element registers the terminal device with the second network based on the second identification information.

It should be noted that, for how the second AMF network element registers the terminal device with the second network based on the second identification information, reference may be made to the following descriptions of FIG. 6A-1 and FIG. 6A-2 to FIG. 6C.

According to the communication method provided in this application, the first AMF network element in the first network receives identification information of the terminal device in the first network from the terminal device, the first AMF network element converts the identification information into identification information of the terminal device in the second network, and sends the identification information to the second AMF network element in the second network, and the second AMF network element registers the terminal device with the second network based on the identification information of the terminal device in the second network. In this way, the terminal device is registered with the second network through the first network.

Optionally, in an implementation scenario of the foregoing embodiment, the communication method further includes the following step:

S505. The second AMF network element sends a network key of the terminal device in the second network to the first AMF network element.

Correspondingly, the first AMF network element receives the network key of the terminal device in the second network from the second AMF network element.

For example, the network key may be a key used by the first AMF network element to perform encryption and integrity protection on a non-access stratum (NAS) and an access stratum (AS); or the network key may be a key generated by the first AMF network element and used by the first AMF network element to perform encryption and integrity protection on a non-access stratum and an access stratum. For example, the network key may be $K_{AMF}$.

When the terminal device needs to send a message to the second network through the first network, the first AMF network element performs encryption by using the network key of the terminal device in the second network.

Optionally, in another implementation scenario of the foregoing embodiment, the first message further includes first indication information, the first indication information is used to indicate whether to register the terminal device with the second network, and the sending, by the first AMF network element, a second message to a second AMF includes: When the first indication information indicates to register the terminal device with the second network, the first AMF network element sends the second message to the second AMF network element.

In other words, when the first indication information indicates to register the terminal device with the second network, the first AMF network element performs step S503, to register the terminal device with the second network.

The first indication information may be carried in the first message in an implicit or explicit manner, and existing information may be reused, or new information may be added. For example, the first indication information may be carried in the first message, to indicate to register the terminal device with the second network; or the first indication information may not be carried in the first message, to indicate not to register the terminal device with the second network.

In this implementation, the terminal device can conveniently indicate the first AMF network element whether to register the terminal device with the second network through the first network.

This application further provides a communication method, including: A first AMF network element in a first network receives identification information of a terminal device in a second network from the terminal device, and sends the identification information to a second AMF network element in the second network, so that the terminal device is registered with the second network through the first network.

Figure 5B:
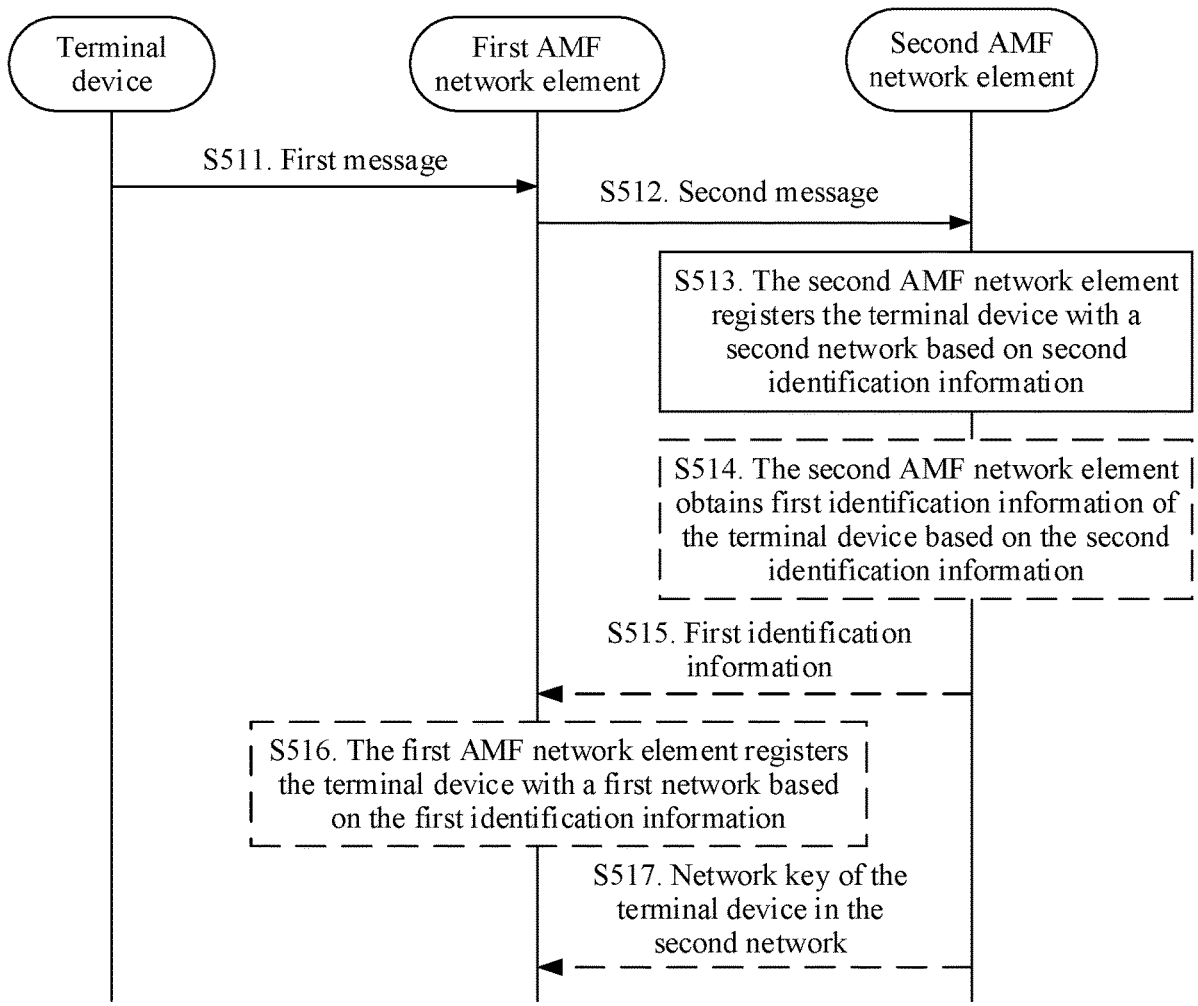
FIG. 5B is a schematic flowchart of a communication method according to an embodiment of this application.

Referring to FIG. 5B, this application provides another communication method. Details are as follows.

S511. A terminal device sends a first message to a first AMF network element.

Correspondingly, the first AMF network element receives the first message from the terminal device.

The first AMF network element is located in a first network.

The first message may be used to request to register the terminal device with the first network. For example, the first message may be a registration request message.

In addition, the first message includes second identification information of the terminal device.

S512. The first AMF network element sends a second message to a second AMF network element.

Correspondingly, the second AMF network element receives the second message from the first AMF network element. The second AMF network element is located in a second network.

The second message may be used to request to register the terminal device with the second network. For example, the second message may be a registration request message.

In addition, the second message includes the second identification information, that is, the second AMF network element receives the second identification information from the first AMF network element.

S513. The second AMF network element registers the terminal device with the second network based on the second identification information.

For step S513, refer to related descriptions of S504. Details are not described again.

According to the communication method provided in this embodiment of this application, the first AMF network element in the first network receives identification information of the terminal device in the second network from the terminal device, and sends the identification information to the second AMF network element in the second network, and the second AMF network element registers the terminal device with the second network based on the identification information of the terminal device in the second network. In this way, the terminal device is registered with the second network through the first network.

Optionally, in an implementation scenario of the foregoing embodiment, the communication method further includes steps S514 to S516.

S514. The second AMF network element obtains first identification information of the terminal device based on the second identification information.

The first identification information is identification information of the terminal device in the first network.

For the first identification information, refer to related descriptions in the embodiment shown in FIG. 5A. Details are not described again.

In a possible implementation, the second AMF network element may obtain, based on a preset correspondence between the first identification information and the second identification information, the first identification information corresponding to the second identification information. For example, the preset correspondence between the first identification information and the second identification information may be preconfigured on the second AMF network element; or the second AMF network element may obtain subscription information of the terminal device in the second network from a UDM network element in the second network, where the subscription information includes the preset correspondence between the first identification information and the second identification information. The second AMF network element may search for the correspondence by using the second identification information, to obtain the first identification information.

In another possible implementation, the second AMF network element may send the second identification information to the UDM network element in the second network, and receive the first identification information from the UDM network element. For example, the first identification information may be carried in the subscription information of the terminal device in the second network.

In still another possible implementation, the second AMF network element may send the second identification information to an AUSF network element in the second network; the second AMF network element receives fourth identification information corresponding to the second identification information from the AUSF network element, where the fourth identification information is another piece of identification information, corresponding to the second identification information, of the terminal device in the second network; the second AMF network element sends the fourth identification information to the UDM network element in the second network; and the second AMF network element receives the first identification information from the UDM network element. For example, the first identification information may be carried in the subscription information of the terminal device in the second network.

For example, the fourth identification information may be an SUPI of the terminal device in the second network; or the fourth identification information may be a 5G-GUTI of the terminal device in the second network.

S515. The second AMF network element sends the first identification information to the first AMF network element.

Correspondingly, the first AMF network element receives the first identification information from the second AMF network element.

S516. The first AMF network element registers the terminal device with the first network based on the first identification information.

Figure 7A:
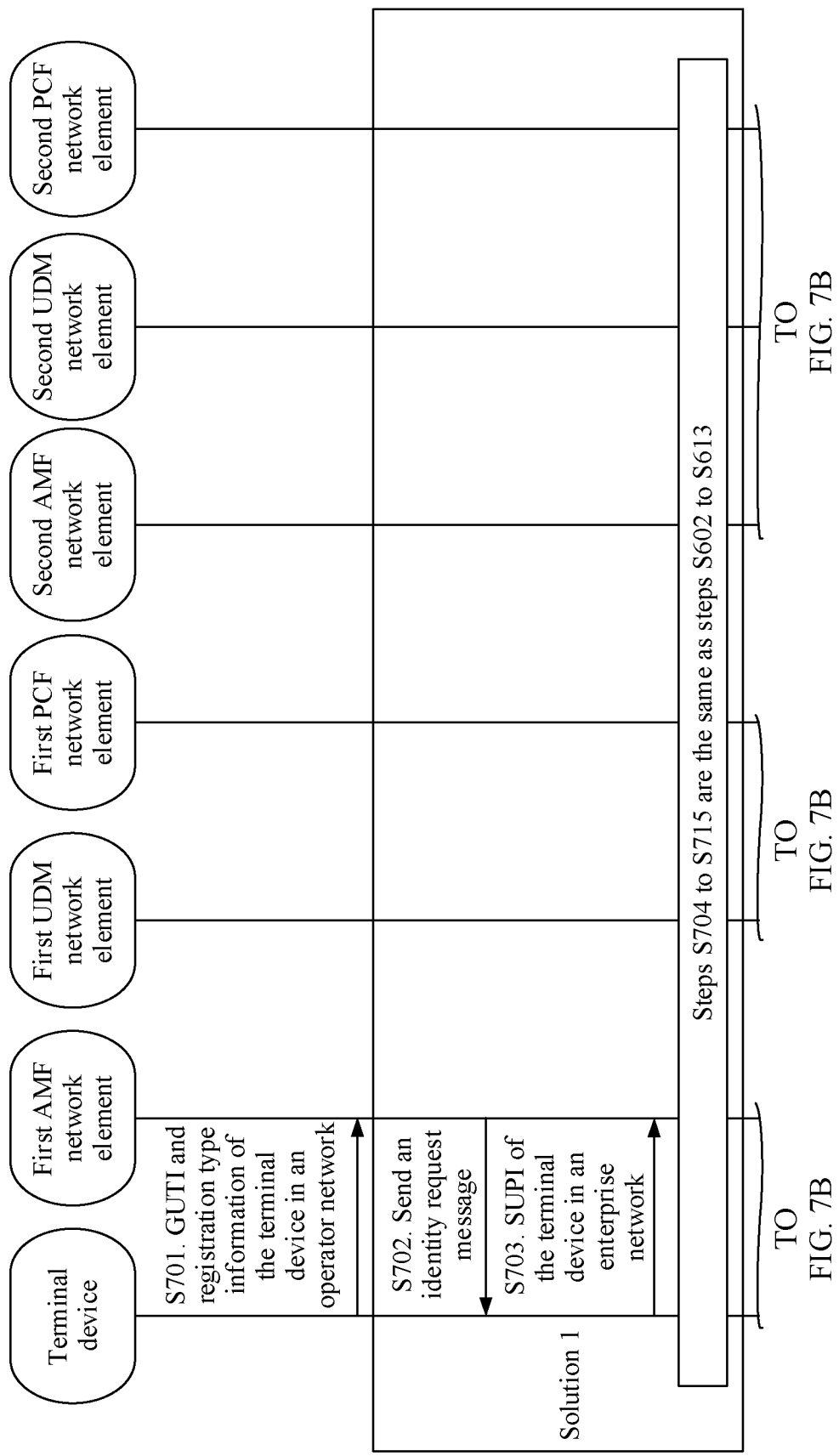
FIG. 7A and FIG. 7B are two parts of a schematic flowchart of a communication method according to an embodiment of this application.
Figure 7B:
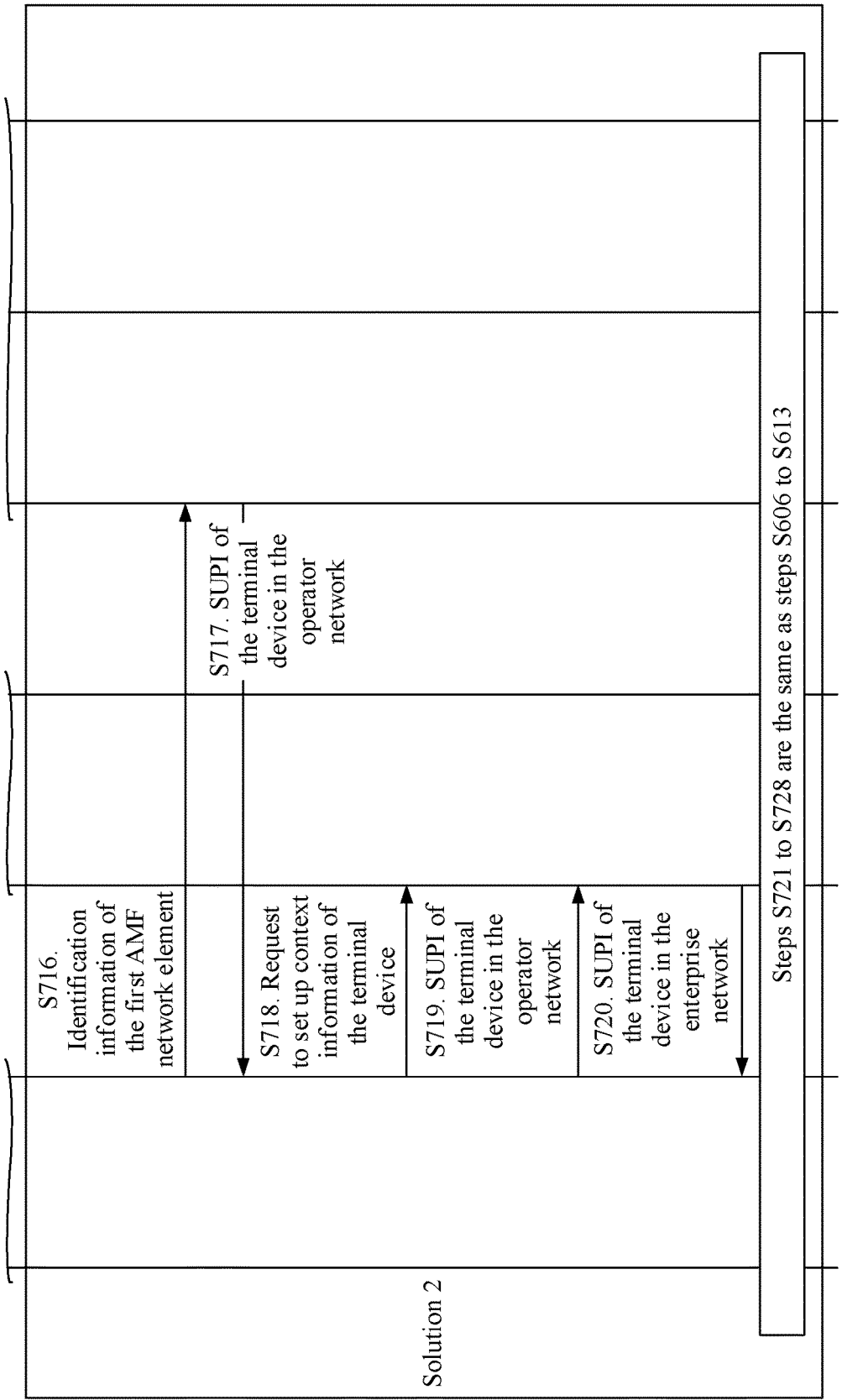
Figure 8:
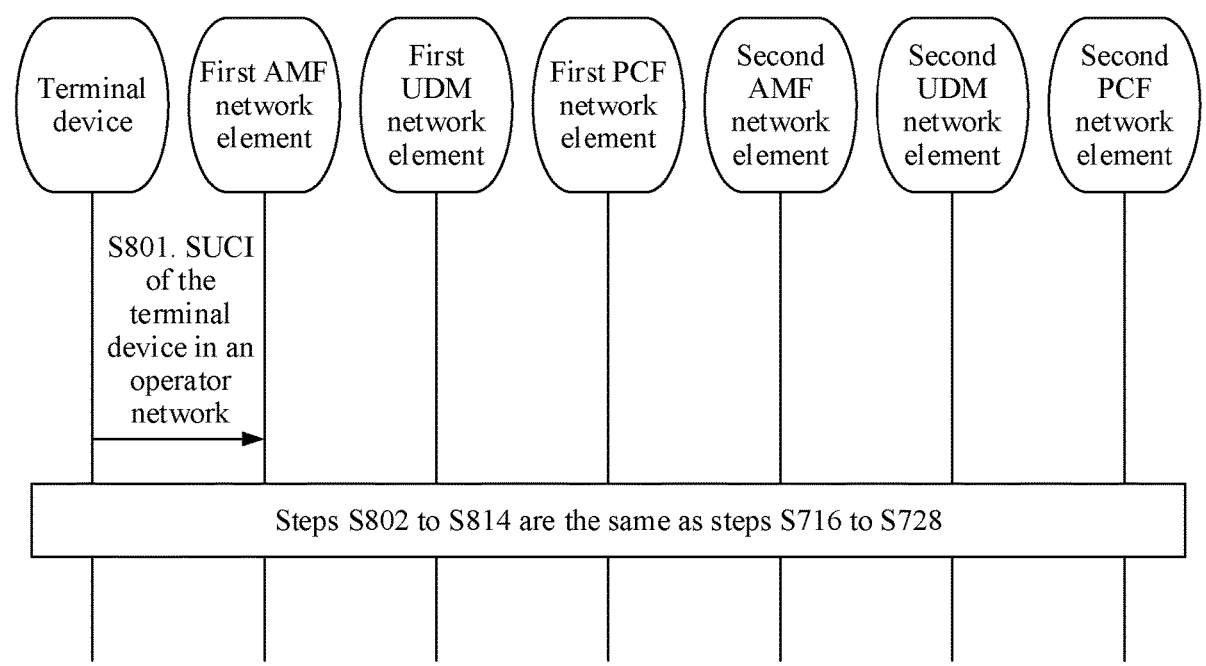
FIG. 8 is a schematic flowchart of a communication method according to an embodiment of this application.

It should be noted that, for how the first AMF network element registers the terminal device with the first network based on the first identification information, reference may be made to the following descriptions of FIG. 7A and FIG. 7B or FIG. 8.

Optionally, in another implementation scenario of the foregoing embodiment, the method further includes the following step:

S517. The second AMF network element sends a network key of the terminal device in the second network to the first AMF network element.

Correspondingly, the first AMF network element receives the network key of the terminal device in the second network from the second AMF network element.

For the network key, refer to related descriptions in the embodiment shown in FIG. 5A. Details are not described again.

Further, when the terminal device needs to send a message to the second network through the first network, the first AMF network element performs encryption by using the network key of the terminal device in the second network.

This application further provides a communication method. A first AMF network element in a first network receives identification information of a terminal device in the first network and identification information of the terminal device in a second network from the terminal device. The first AMF network element obtains an authentication vector of the terminal device in the first network based on the identification information of the terminal device in the first network. The first AMF network element sends the identification information of the terminal device in the second network to a second AMF network element in the second network, to obtain an authentication vector of the terminal device in the second network. Further, the first AMF network element sends the authentication vector of the terminal device in the first network and the authentication vector of the terminal device in the second network to the terminal device, for the terminal device to perform authentication on the first network and the second network, so that the terminal device further performs authentication on the first network and the second network.

Figure 5C:
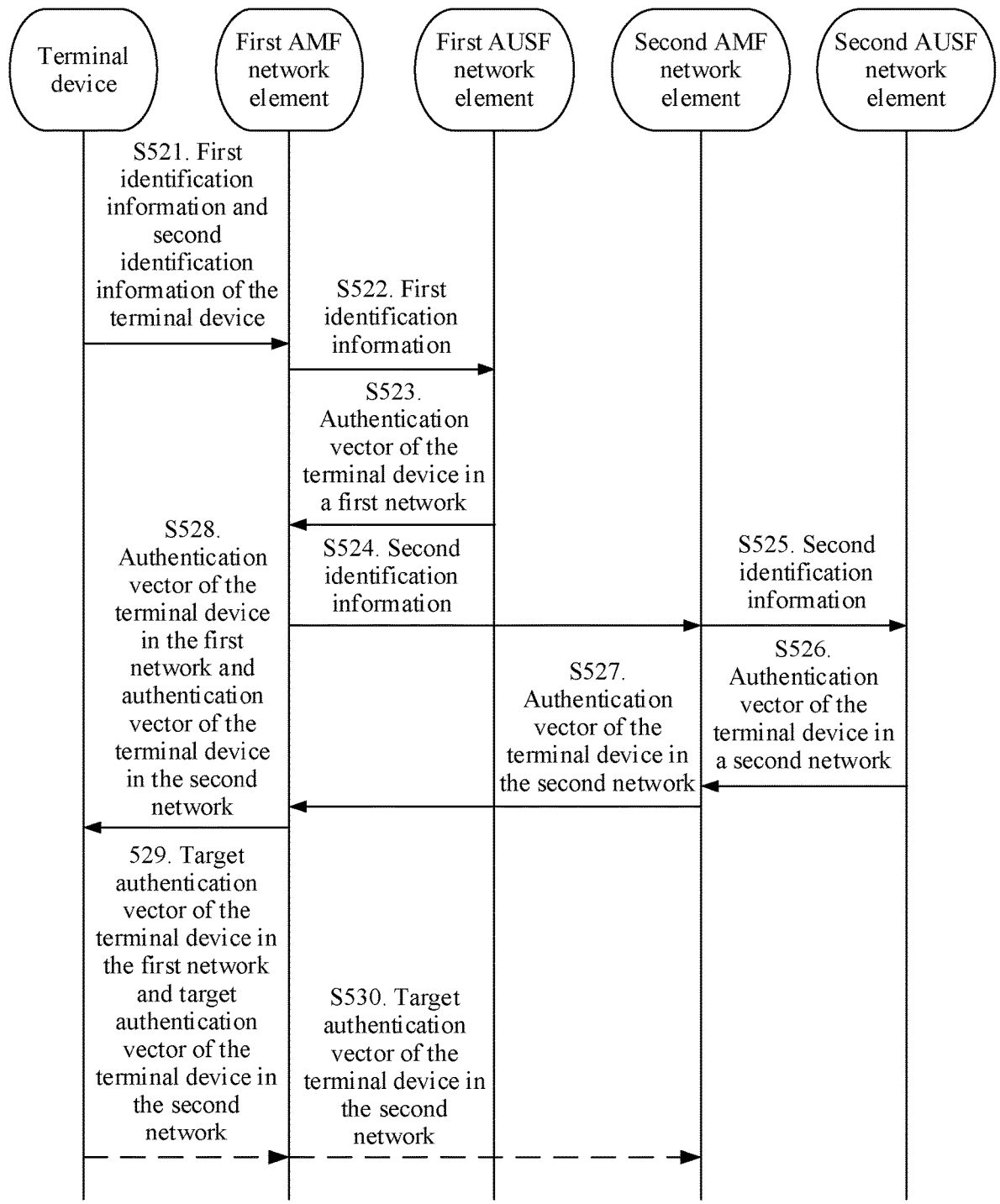
FIG. 5C is a schematic flowchart of a communication method according to an embodiment of this application.

Referring to FIG. 5C, an embodiment of this application provides another communication method. Details are as follows.

S521. A terminal device sends first identification information and second identification information of the terminal device to a first AMF network element.

Correspondingly, the first AMF network element receives the first identification information and the second identification information of the terminal device from the terminal device.

The first identification information is identification information of the terminal device in a first network. The second identification information is identification information of the terminal device in a second network.

The first AMF network element is located in the first network.

For the first network, the second network, the first identification information, and the second identification information, refer to related descriptions in the foregoing embodiments. Details are not described again.

S522. The first AMF network element sends the first identification information to a first AUSF network element.

Correspondingly, the first AUSF network element receives the first identification information from the first AMF network element.

The first identification information may be used to generate an authentication vector of the terminal device in the first network.

In addition, the first AUSF network element is located in the first network.

S523. The first AUSF network element generates the authentication vector of the terminal device in the first network based on the first identification information, and sends the authentication vector of the terminal device in the first network to the first AMF network element.

Correspondingly, the first AMF network element receives the authentication vector of the terminal device in the first network from the first AUSF network element.

S524. The first AMF network element sends the second identification information to a second AMF network element.

Correspondingly, the second AMF network element receives the second identification information from the first AMF network element.

The second identification information may be used to generate an authentication vector of the terminal device in the second network.

The second AMF network element is located in the second network.

In a possible implementation, the method may further include: The first AMF network element sends a public land mobile network identifier (PLMN ID) of the first network to the second AMF network element. Correspondingly, the second AMF network element receives the PLMN ID of the first network from the first AMF network element. The PLMN ID of the first network is used to generate the authentication vector of the terminal device in the second network. In addition, the PLMN ID of the first network and the second identification information may be carried in one message, or may be carried in different messages. This is not limited.

It should be noted that there is no execution sequence between steps S523 and S524.

S525. The second AMF network element sends the second identification information to a second AUSF network element.

With reference to the possible implementation of step S524, the second AMF network element may send the PLMN ID of the first network to the second AUSF network element. The second AUSF network element is an AUSF network element in the second network.

S526. The AUSF network element in the second network generates the authentication vector of the terminal device in the second network based on the second identification information, and sends the authentication vector of the terminal device in the second network to the second AMF network element.

Correspondingly, the second AMF network element receives the authentication vector of the terminal device in the second network from the AUSF network element in the second network.

With reference to the possible implementation of step S525, the AUSF network element in the second network may generate the authentication vector of the terminal device in the second network based on the PLMN ID of the first network and the second identification information.

S527. The second AMF network element sends the authentication vector of the terminal device in the second network to the first AMF network element.

Correspondingly, the first AMF network element receives the authentication vector of the terminal device in the second network from the second AMF network element.

S528. The first AMF network element sends the authentication vector of the terminal device in the first network and the authentication vector of the terminal device in the second network to the terminal device.

Correspondingly, the terminal device receives the authentication vector of the terminal device in the first network and the authentication vector of the terminal device in the second network from the first AMF network element.

Further, the method may further include: The terminal device performs authentication on the first network based on the authentication vector of the terminal device in the first network, and performs authentication on the second network based on the authentication vector of the terminal device in the second network.

How to perform authentication based on the authentication vector belongs to the prior art, and details are not described.

Further, the method may further include: The second AMF network element sends a network key of the terminal device to the first AMF network element. Correspondingly, the first access and mobility management function network element receives the network key of the terminal device from the second access and mobility management function network element. The network key may be used for security protection for both a message or data between the terminal device and the first network and a message or data between the terminal device and the second network.

According to the communication method provided in this application, the first AMF network element in the first network receives the identification information of the terminal device in the first network and the identification information of the terminal device in the second network from the terminal device, and the first AMF network element obtains the authentication vector of the terminal device in the first network based on the identification information of the terminal device in the first network. The first AMF network element sends the identification information of the terminal device in the second network to the second AMF network element in the second network, to obtain the authentication vector of the terminal device in the second network. Further, the first AMF network element sends the authentication vector of the terminal device in the first network and the authentication vector of the terminal device in the second network to the terminal device, for the terminal device to perform authentication on the first network and the second network, so that the terminal device further performs authentication on the first network and the second network.

In addition, the first AMF network element in the first network may send the authentication vector of the terminal device in the first network and the authentication vector of the terminal device in the second network to the terminal device by using one message. This avoids sending the authentication vectors by using two messages, thereby reducing resource consumption of an air interface.

Optionally, in an implementation scenario of the foregoing embodiment, the method further includes steps S529 and S530.

S529. The terminal device sends a target authentication vector of the terminal device in the first network and a target authentication vector of the terminal device in the second network to the first AMF network element.

Correspondingly, the first AMF network element may receive the target authentication vector of the terminal device in the first network and the target authentication vector of the terminal device in the second network from the terminal device.

The target authentication vector of the terminal device in the first network may be an authentication vector generated by the terminal device based on the received authentication vector of the terminal device in the first network (refer to step S528). For example, the target authentication vector is generated based on a parameter in the authentication vector of the terminal device in the first network. This is not limited.

The target authentication vector of the terminal device in the second network may be an authentication vector generated by the terminal device based on the received authentication vector of the terminal device in the second network (refer to step S528).

Further, the first AMF network element may perform authentication on the terminal device based on the target authentication vector of the terminal device in the first network.

S530. The first AMF network element sends the target authentication vector of the terminal device in the second network to the second AMF network element.

For example, the second AMF network element may perform authentication on the terminal device based on the target authentication vector of the terminal device in the second network.

According to the communication method in the foregoing implementation scenario, the terminal device sends the target authentication vector of the terminal device in the first network and the target authentication vector of the terminal device in the second network to the first AMF network element, so that the first network and the second network may perform authentication on the terminal device. In addition, the terminal device may send the target authentication vector of the terminal device in the first network and the target authentication vector of the terminal device in the second network to the first AMF network element by using one message. This avoids sending the target authentication vectors by using two messages, thereby reducing resource consumption of an air interface.

This application further provides a communication method. A first AMF network element in a first network receives a first registration message of a terminal device from the terminal device, and the first AMF network element performs registration with a second AMF network element in a second network based on the first registration message, so that the terminal device is registered with the second network through the first network.

Figure 5D:
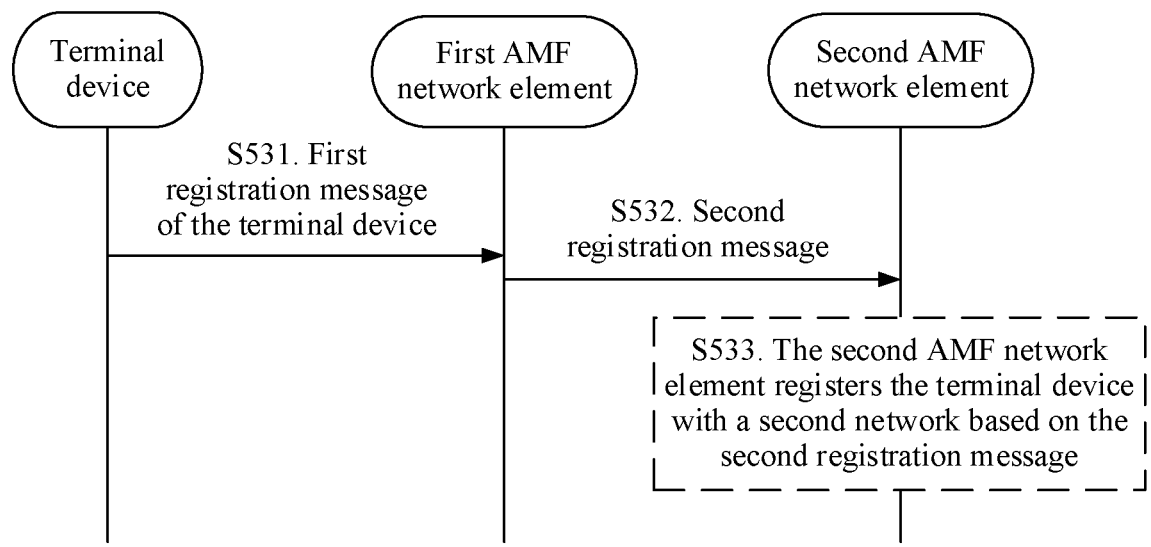
FIG. 5D is a schematic flowchart of a communication method according to an embodiment of this application.

Referring to FIG. 5D, an embodiment of this application provides another communication method. Details are as follows.

S531. A terminal device sends a first registration message of the terminal device to a first AMF network element.

Correspondingly, the first AMF network element receives the first registration message of the terminal device from the terminal device.

The first AMF network element is located in a first network.

The first registration message is used to request to register the terminal device with the first network. For example, the first registration message may be a registration request message.

In a possible implementation, the first registration message may include first indication information, and the first indication information is used to indicate whether to register the terminal device with a second network.

In a possible implementation, the first registration message may include identification information of the terminal device.

For example, the identification information may be an SUCI, an SUPI, or a 5G-GUTI of the terminal device.

In a possible implementation, the first registration message may include network identification information, and the network identification information is used to identify the first network or the second network.

For example, the network identification information may be a PLMN ID; or the network identification information may be a mobile network code (MNC).

For the first network and the second network, refer to related descriptions in the foregoing embodiments. Details are not described again.

S532. The first AMF network element sends a second registration message to a second AMF network element based on the first registration message.

The second AMF network element is located in the second network.

The second registration message is used to request to register the terminal device with the second network. For example, the second registration message may be a registration request message.

Step S532 may be implemented in the following manners.

Manner 1: When the first registration message carries first indication information, and the first indication information is used to indicate to register the terminal device with the second network, the first AMF network element sends the second registration message to the second AMF network element.

Manner 2: When the first registration message carries identification information of the terminal device in the second network, the first AMF network element sends the second registration message to the second AMF network element.

Manner 3: When the first registration message carries network identification information, and the network identification information is used to identify the second network, the first AMF network element sends the second registration message to the second AMF network element.

S533. The second AMF network element registers the terminal device with the second network based on the second registration message.

According to the communication method provided in this application, the first AMF network element in the first network receives the first registration message of the terminal device from the terminal device, and the first AMF network element performs registration with the second AMF network element in the second network based on the first registration message. In this way, the terminal device is registered with the second network through the first network.

Figure 1:
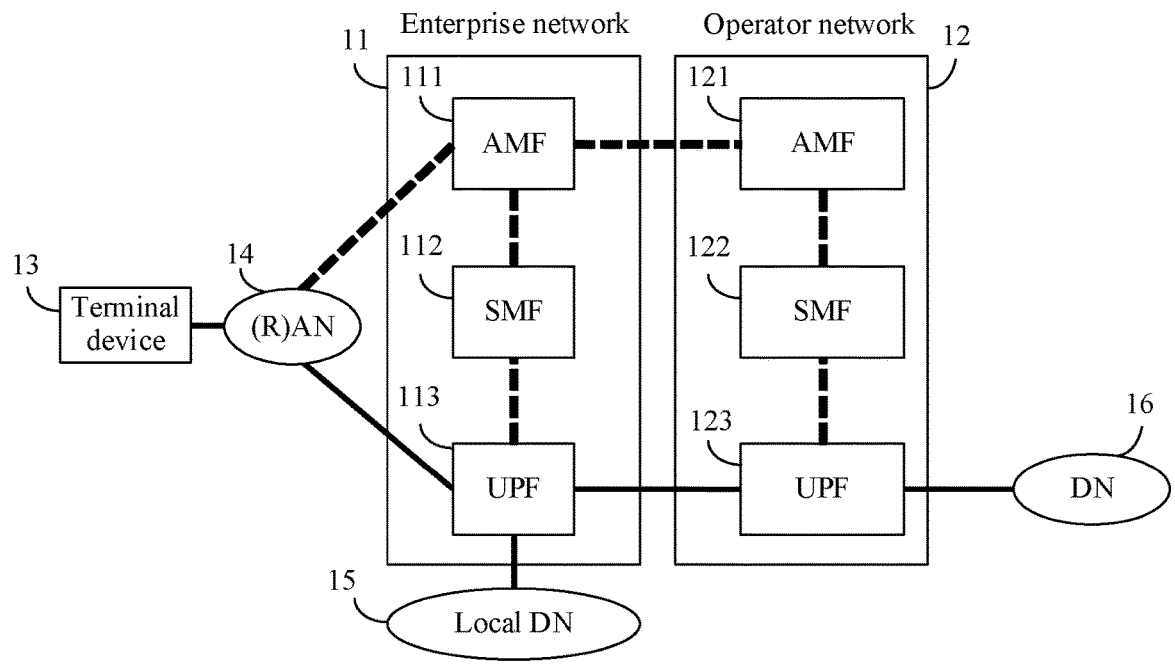
FIG. 1 is a schematic architectural diagram 1 of a communications system.
Figures 1, 6A:
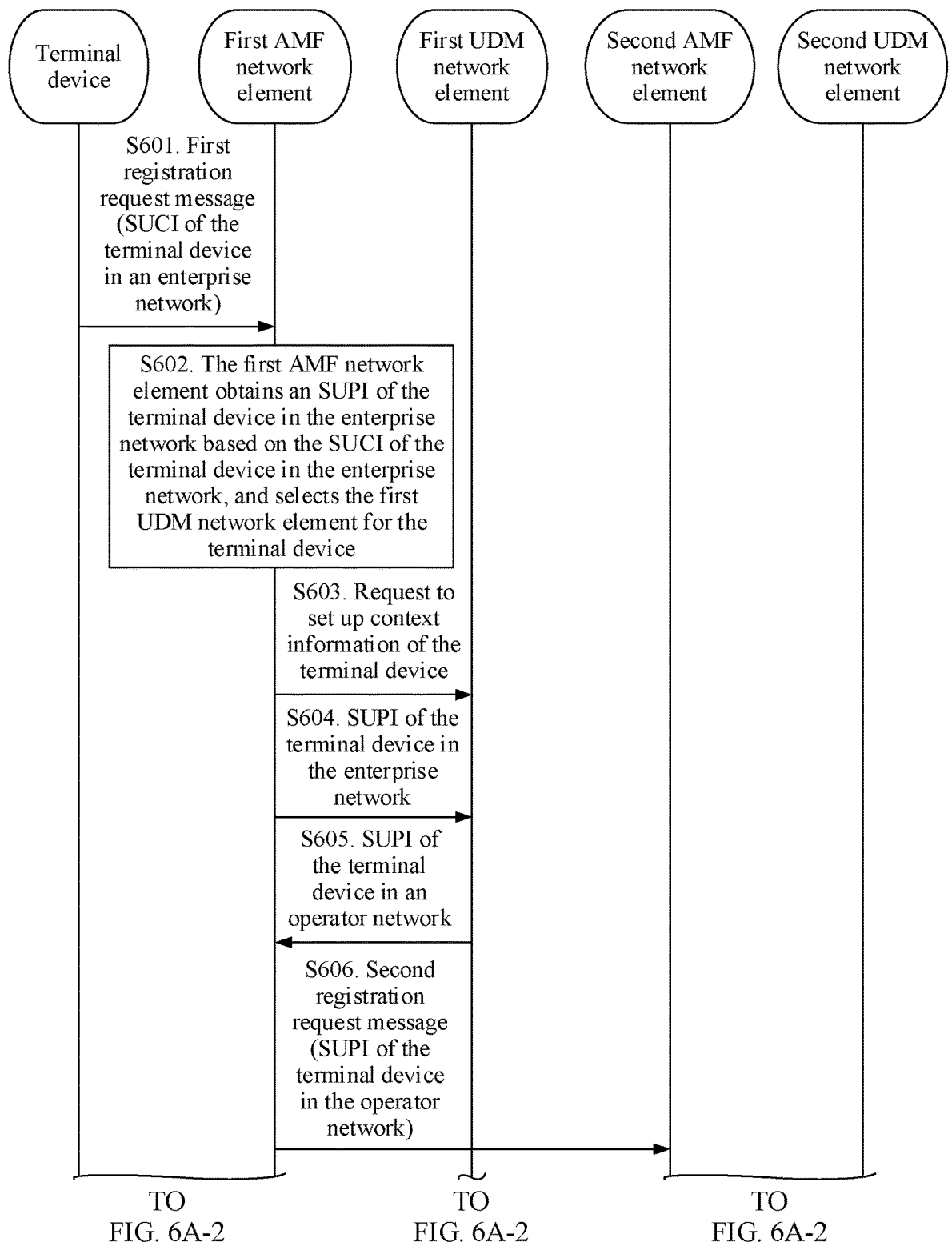
Figures 2, 6A:
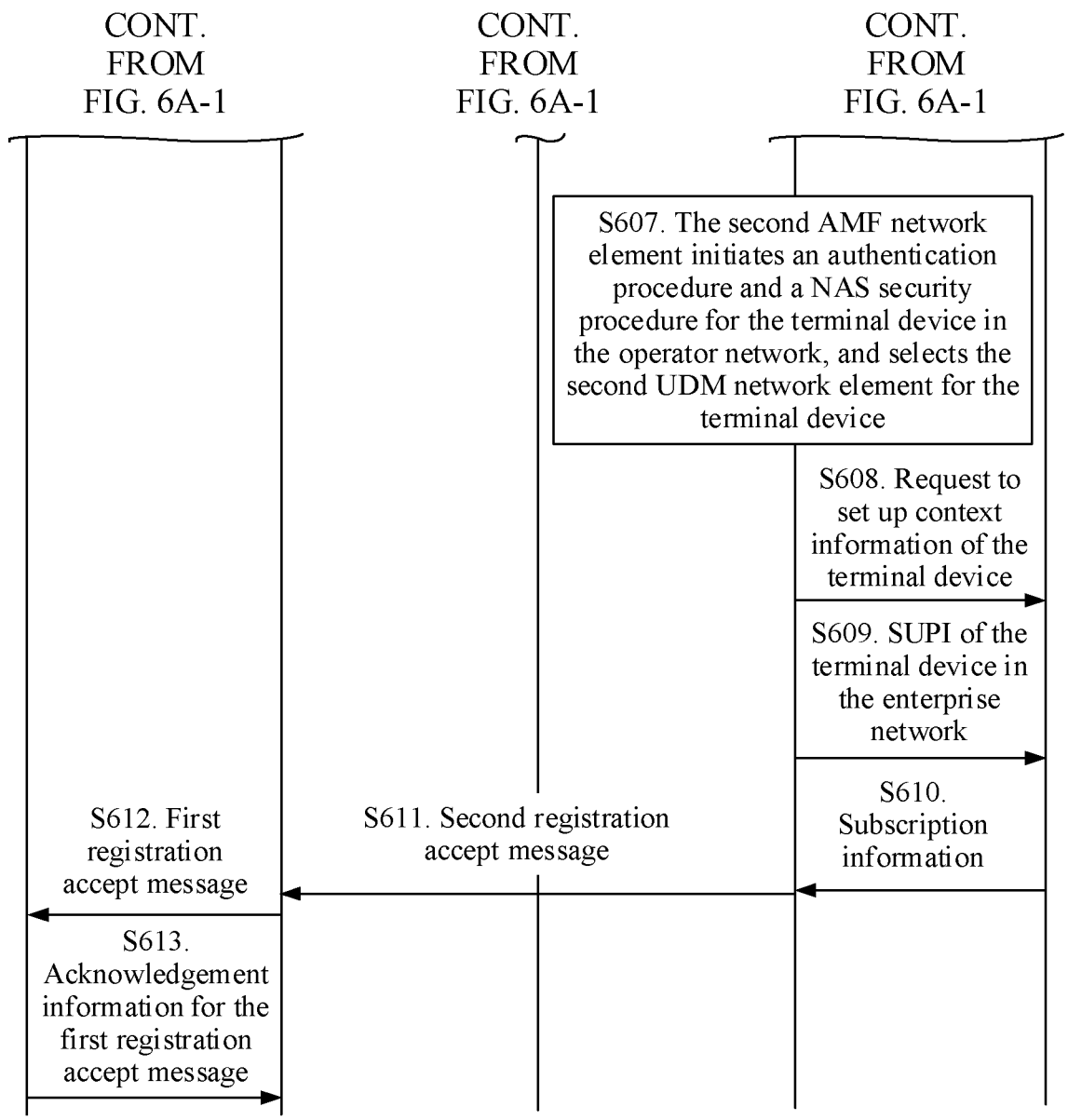

Referring to FIG. 6A-1 and FIG. 6A-2, an embodiment of this application provides another communication method. The communication method shown in FIG. 5A may be used as a basis. To be specific, descriptions are provided by using the following example: In the embodiment shown in FIG. 5A, the first network is an enterprise network, and the second network is an operator network; the first AMF network element is an AMF network element in the enterprise network, and the second AMF network element is an AMF network element in the operator network; a first AUSF network element is an AUSF network element in the enterprise network, and a second AUSF network element is an AUSF network element in the operator network; a first UDM network element is a UDM network element in the enterprise network, and a second UDM network element is a UDM network element in the operator network.

Further, the first identification information of the terminal device may be an SUCI of the terminal device in the enterprise network, and the SUCI is encrypted identification information of the terminal device in the enterprise network. Alternatively, the first identification information of the terminal device may be an SUPI of the terminal device in the enterprise network, and the SUPI is unencrypted identification information of the terminal device in the enterprise network. The second identification information of the terminal device may be an SUPI of the terminal device in the operator network, and the SUPI is unencrypted identification information of the terminal device in the operator network. Alternatively, the second identification information of the terminal device may be an SUCI of the terminal device in the operator network, and the SUCI is encrypted identification information of the terminal device in the operator network.

As shown in FIG. 6A-1 and FIG. 6A-2, the communication method is specifically described as follows.

S601. The terminal device sends a first registration request message to the first AMF network element.

The first registration request message includes the SUCI of the terminal device in the enterprise network.

Correspondingly, the first AMF network element receives the first registration request message from the terminal device.

The registration request message may be a non-access stratum (NAS) message.

S602. The first AMF network element obtains the SUPI of the terminal device in the enterprise network based on the SUCI of the terminal device in the enterprise network, and selects the first UDM network element for the terminal device.

Figure 6B:
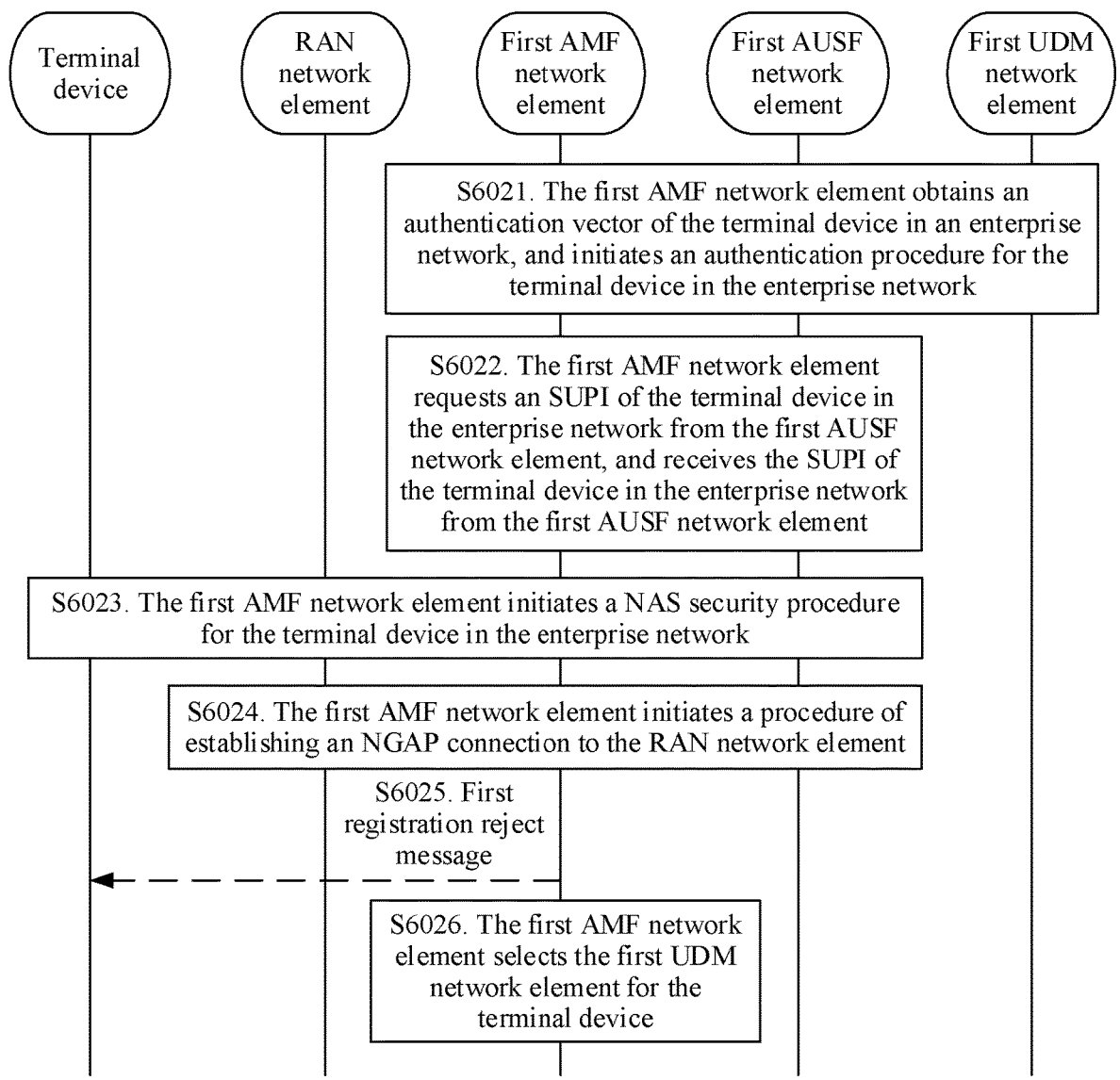
FIG. 6B is a schematic flowchart of a communication method according to an embodiment of this application.

Specifically, as shown in FIG. 6B, step S602 may include steps S6021 to S6026.

S6021. The first AMF network element obtains an authentication vector of the terminal device in the enterprise network, and initiates an authentication procedure for the terminal device in the enterprise network.

Specifically, in step S6021, the obtaining, by the first AMF network element, an authentication vector of the terminal device in the enterprise network may include: The first AMF network element selects the first AUSF network element for the terminal device based on the SUCI of the terminal device in the enterprise network. The first AUSF network element obtains the authentication vector of the terminal device in the enterprise network from the first UDM network element. The first AMF network element obtains, from the first AUSF network element, the authentication vector of the terminal device in the enterprise network, for example, a 5G AV (RAND, AUTN, HXRES*, KSEAF).

For example, the first AMF network element may select the first AUSF network element based on a local configuration, or send a query message, for example, an Nnrf_NF-Discovery_Request message, to a network repository function (NRF) network element, where the query message may include an MNC field and/or an MCC field in the SUCI of the terminal device in the enterprise network, or a routing identifier (routing ID) field in the SUCI. Then the NRF network element sends, to the first AMF network element, an AUSF network element candidate list corresponding to the MNC field and/or the MCC field, or the routing ID field. Then the first AMF network element selects the first AUSF network element from the AUSF network element candidate list. For example, the first AMF network element may randomly select the first AUSF network element from the AUSF network element candidate list.

Further, the first AUSF network element may obtain the authentication vector of the terminal device in the enterprise network from the first UDM network element. Specifically, the first AUSF network element may send the SUCI of the terminal device in the enterprise network to the first UDM network element, and the SUCI of the terminal device in the enterprise network may be carried in an authentication vector obtaining message (for example, an Nudm_UEAuthenticate_Get message). The message is used to obtain the authentication vectors of the terminal device in the enterprise network. After receiving the SUCI of the terminal device in the enterprise network, the first UDM network element sends the authentication vector of the terminal device in the enterprise network to the first AUSF network element.

In addition, the authentication procedure initiated by the first AMF network element for the terminal device in the enterprise network in step S6021 may include: An authentication vector stored in the first AMF network element includes an element used for authentication, for example, HXRES*, used to perform authentication on the terminal device. The first AMF network element sends, to the terminal device, information that is in the authentication vector and that is used for the terminal device to generate an authentication element, for example, RAND and AUTN. After receiving the information used for the terminal device to generate an authentication element, the terminal device generates, based on the information, an original element used for authentication, for example, RES*, and sends the original element to the first AMF network element. Then the first AMF network element generates, based on the original element that is used for authentication and that comes from the terminal device, an element used for authentication, for example, HRES*, and compares the element used for authentication with the stored element used for authentication (for example, HXRES*). If the two elements are the same, the first AMF network element successfully authenticates the terminal device in the enterprise network.

Optionally, when the first AMF network element successfully authenticates the terminal device in the enterprise network, steps S6022 and S6023 are performed. An execution sequence of steps S6022 and S6023 is not limited.

S6022. The first AMF network element requests the SUPI of the terminal device in the enterprise network from the first AUSF network element, and receives the SUPI of the terminal device in the enterprise network from the first AUSF network element.

The SUPI is unencrypted identification information of the terminal device in the enterprise network.

S6023. The first AMF network element initiates a NAS security procedure for the terminal device in the enterprise network.

For example, when the first AMF network element successfully authenticates the terminal device, the first AMF network element generates a NAS security key. For example, the first AMF network element generates the NAS security key based on KSEAF (an element that is in the authentication vector of the terminal device in the enterprise network and that is used to generate a key). In addition, the first AMF network element sends a security mode command message to the terminal device. The message includes algorithm information used for the terminal device to perform NAS encryption. After receiving the message, the terminal device generates a NAS security key, and encrypts, by using the generated NAS security key, a security mode complete message to be returned. When the first AMF network element can successfully decrypt, by using the NAS security key, the message returned by the terminal device, the NAS security procedure is successfully performed.

S6024. The first AMF network element initiates a procedure of establishing a next generation application protocol (NGAP) connection to a RAN network element.

For example, the first AMF network element may send a security context to the RAN network element, and the RAN network element stores the security context, and sends an acknowledgement message to the first AMF network element.

Optionally, when the first AMF network element fails to initiate authentication on the terminal device, the NAS security procedure is not successfully performed, or the RAN network element has no available radio resource, step S6025 is performed. Otherwise, step S6026 and subsequent steps are performed.

For example, after receiving the original element used for authentication from the terminal device, the first AMF network element generates, based on the original element, an element used for authentication. If the element used for authentication is different from the stored element used for authentication, or the first AMF network element does not receive the original element used for authentication from the terminal device and generate the element used for authentication within a preset time, it indicates that the authentication fails. For another example, if the first AMF network element cannot successfully decrypt the security mode complete message sent by the terminal device, or the first AMF network element does not receive the security mode complete message from the terminal device within a preset time, it indicates that the NAS security procedure is not successfully performed. For another example, if the first AMF network element receives, from the RAN network element, a message used to indicate that context setup of the terminal device fails, it indicates that the RAN network element has no available radio resource.

If the RAN network element has no available radio resource, the first AMF network element cannot establish a connection to the RAN network element.

S6025. The first AMF network element sends a first registration reject message to the terminal device.

Step S6025 means that a registration procedure for the terminal device in the enterprise network fails, the procedure ends, and step S6026 and steps S603 to S613 are not to be performed.

It should be noted that, if the terminal device does not send permanent device identification information (for example, a hardware device number) of the terminal device to the first AMF network element before step S6024, the first AMF network element may request the permanent device identification information from the terminal device after step S6026.

S6026. The first AMF network element selects the first UDM network element for the terminal device.

For example, the first AMF network element may select the first UDM network element for the terminal device based on the SUPI, obtained in step S6022, of the terminal device in the enterprise network.

S603. The first AMF network element requests the first UDM network element to set up context information of the terminal device.

For example, the first AMF network element may send a terminal device context setup request (Nudm_UECM_Registration Request) message to the first UDM network element, and the first UDM network element may send a terminal device context setup response (Nudm_UECM_Registration Response) message to the first AMF network element.

The terminal device context setup request message is used to request to set up the context information of the terminal device on the first UDM network element.

S604. The first AMF network element sends the SUPI of the terminal device in the enterprise network to the first UDM network element.

Correspondingly, the first UDM network element receives the SUPI of the terminal device in the enterprise network from the first AMF network element.

For example, the SUPI of the terminal device in the enterprise network may be carried in an enterprise network subscription information obtaining request (Nudm_SDM_Get Request) message. The message is used to request subscription information of the terminal device in the enterprise network. The subscription information includes the SUPI of the terminal device in the operator network that corresponds to the SUPI of the terminal device in the enterprise network.

S605. The first UDM network element searches for the SUPI of the terminal device in the operator network that corresponds to the SUPI of the terminal device in the enterprise network, and sends the SUPI of the terminal device in the operator network to the first AMF network element.

Correspondingly, the first AMF network element receives, from the first UDM network element, the SUPI of the terminal device in the operator network that corresponds to the SUPI of the terminal device in the enterprise network. The SUPI of the terminal device in the operator network may be carried in subscription information of the terminal device in the enterprise network. The subscription information of the terminal device in the enterprise network may be carried in an enterprise network subscription information obtaining response message (for example, Nudm_SDM_Get Response).

Optionally, if the first AMF network element receives the SUPI of the terminal device in the operator network, the first AMF network element determines that the terminal device can register with the operator network, and steps S606 to S616 are performed. Otherwise, the first AMF network element determines that the first identification information cannot be used to register with the operator network, a registration procedure is performed only within the enterprise network, and steps S606 to S616 are not to be performed.

It should be noted that, if the terminal device cannot register with the operator network, the terminal device is registered only within the enterprise network. In this case, the terminal device cannot access the operator network.

S606. The first AMF network element sends a second registration request message to the second AMF network element.

The second registration request message includes the SUPI of the terminal device in the operator network.

Correspondingly, the second AMF network element receives the second registration request message from the first AMF network element.

S607. The second AMF network element initiates an authentication procedure and a NAS security procedure for the terminal device in the operator network, and selects the second UDM network element for the terminal device.

Figure 6C:
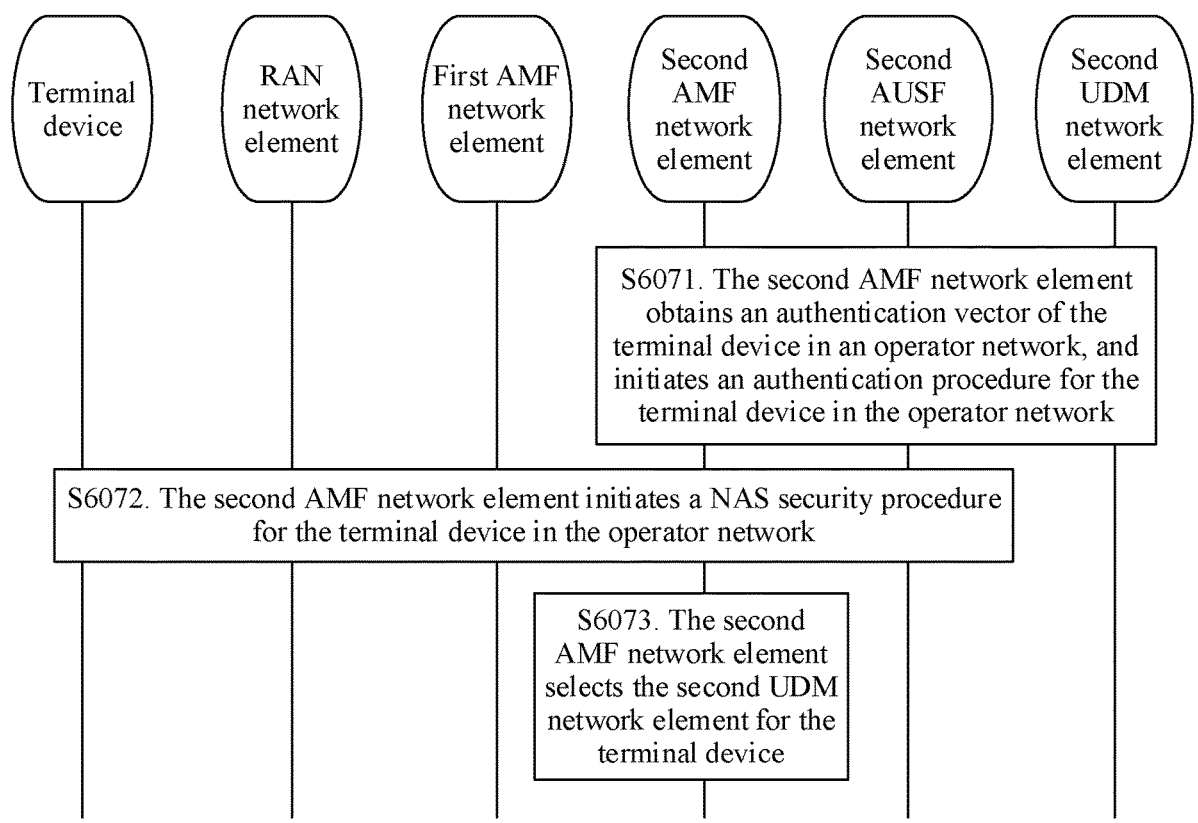
FIG. 6C is a schematic flowchart of a communication method according to an embodiment of this application.

Specifically, as shown in FIG. 6C, step S607 may include S6071 to S6073.

S6071. The second AMF network element obtains an authentication vector of the terminal device in the operator network, and initiates the authentication procedure for the terminal device in the operator network.

Specifically, in step S6071, the obtaining, by the second AMF network element, an authentication vector of the terminal device in the operator network may include: The second AMF network element selects the second AUSF network element for the terminal device based on the SUPI of the terminal device in the operator network. The second AUSF network element obtains the authentication vector of the terminal device in the operator network from the second UDM network element. The second AMF network element obtains, from the second AUSF network element, the authentication vector of the terminal device in the enterprise network, for example, a 5G AV (RAND, AUTN, HXRES*, KSEAF).

For example, the second AMF network element may select the first AUSF network element based on a local configuration, or send a query message, for example, an Nnrf_NFDiscovery_Request message, to an NRF network element, where the query message may include the SUPI of the terminal device in the operator network. Then the NRF network element sends, to the second AMF network element, an AUSF network element candidate list corresponding to the SUPI. Then the second AMF network element selects the second AUSF network element from the AUSF network element candidate list. For example, the second AMF network element may randomly select the second AUSF network element from the AUSF network element candidate list. Further, the second AUSF network element may send the SUPI of the terminal device in the operator network to the second UDM network element, and the SUPI of the terminal device in the operator network may be carried in an authentication vector obtaining message (for example, an Nudm_UEAuthenticate_Get message). The message is used to obtain the authentication vector of the terminal device in the operator network. After receiving the SUPI of the terminal device in the operator network, the second UDM network element sends the authentication vector of the terminal device in the operator network to the second AUSF network element.

In addition, the authentication procedure initiated by the second AMF network element for the terminal device in the operator network is the same as the method for performing authentication on the terminal device by the first AMF network element in step S6021, and is not repeated herein.

S6072. The second AMF network element initiates the NAS security procedure for the terminal device in the operator network.

For example, when the second AMF network element successfully authenticates the terminal device, the second AMF network element generates a NAS security key. For example, the second AMF network element generates the NAS security key based on KSEAF (an element that is in the authentication vector of the terminal device in the operator network and that is used to generate a key). In addition, the second AMF network element sends a security mode command message to the terminal device. The message includes algorithm information used for the terminal device to perform NAS encryption. After receiving the message, the terminal device generates a NAS security key, and encrypts, by using the generated NAS security key, a security mode complete message to be returned. When the second AMF network element can successfully decrypt, by using the NAS security key, the message returned by the terminal device, the NAS security procedure is successfully performed.

S6073. The second AMF network element selects the second UDM network element for the terminal device.

For example, the second AMF network element may select the second UDM network element for the terminal device based on the SUPI of the terminal device in the operator network.

S608. The second AMF network element requests the second UDM network element to set up context information of the terminal device.

For example, the second AMF network element may send a context setup request message (for example, Nudm_UECM_Registration Request) to the second UDM network element, and the second UDM network element may send a context setup response message (for example, Nudm_UECM_Registration Response) to the second AMF network element. The message is used to set up the context information of the terminal device on the second UDM network element.

Step S608 may trigger the setup of the context information of the terminal device on the second UDM network element in the operator network.

S609. The second AMF network element sends the SUPI of the terminal device in the operator network to the second UDM network element.

Correspondingly, the second UDM network element receives the SUPI of the terminal device in the operator network from the second AMF network element. For example, the SUPI of the terminal device in the operator network may be carried in an operator network subscription information obtaining request message (for example, Nudm_SDM_Get Request). The message may be used to request subscription information of the terminal device in the operator network.

S610. The second UDM network element searches for the subscription information of the terminal device based on the SUPI of the terminal device in the operator network, and sends the subscription information to the second AMF network element.

The subscription information may include mobility restriction information of the terminal device, an aggregate maximum bit rate of the terminal device, and the like. The subscription information is used for the second AMF network element to provide a corresponding network resource for the terminal device.

S611. The second AMF network element sends a second registration accept message to the first AMF network element.

The second registration accept message may include temporary identification information, of the terminal device in the operator network, that is allocated by the second AMF network element to the terminal device, for example, a 5G-GUTI.

For example, after receiving the subscription information in step S610, the second AMF network element may perform step S611; or after establishing an association with a PCF network element based on the subscription information, the second AMF network element may perform step S611. This is not limited.

That the second AMF network element establishes the association with the PCF network element based on the subscription information belongs to the prior art, and details are not described.

S612. The first AMF network element sends a first registration accept message to the terminal device.

In a possible implementation, the first AMF network element may store a mapping relationship between the temporary identification information of the terminal device in the operator network and temporary identification information of the terminal device in the enterprise network. The first registration accept message includes the temporary identification information of the terminal device in the enterprise network. In this way, the terminal device does not need to perceive a difference between the enterprise network and the operator network, and when the terminal device performs registration next time, the terminal device may further send the SUCI of the terminal device in the enterprise network to the first AMF network element, and therefore can be compatible with an implementation of an existing terminal device.

In another possible implementation, the first registration accept message includes the temporary identification information of the terminal device in the operator network and the temporary identification information of the terminal device in the enterprise network. In this way, the terminal device may flexibly distinguish, by using the two temporary identification tokens, whether an accessed network is the enterprise network or the operator network.

S613. The terminal device sends an acknowledgement message for the first registration accept message to the first AMF network element.

According to the communication method provided in this application, when the terminal device provides only the identification information of the terminal device in the enterprise network, a core network device in the enterprise network obtains the identification information of the terminal device in the operator network, and sends the identification information of the terminal device in the operator network to a core network device in the operator network, to register the terminal device with the operator network.

This application further provides a communication method, used in the following scenario: A terminal device has registered with an operator network, and has a temporary identifier allocated by the operator network to the terminal device, the terminal device accesses an enterprise network due to movement, and the enterprise network is not in a registration area of the operator network. In this case, the terminal device performs a mobility registration update procedure.

The communication method may correspond to the communication method shown in FIG. 5B, in which the first network is the enterprise network, and the second network is the operator network; the first AMF network element is an AMF network element in the enterprise network, and the second AMF network element is an AMF network element in the operator network; a first UDM network element is a UDM network element in the enterprise network, and a second UDM network element is a UDM network element in the operator network. The first identification information of the terminal device is an SUPI of the terminal device in the enterprise network, and the SUPI is unencrypted identification information of the terminal device in the enterprise network. The second identification information of the terminal device includes a GUTI of the terminal device in the operator network and an SUPI of the terminal device in the operator network. The GUTI is temporary identification information of the terminal device in the operator network. The SUPI is unencrypted identification information of the terminal device in the operator network.

Referring to FIG. 7A and FIG. 7B, the communication method includes steps S701 to S728. Steps S702 to S715 and steps S716 to S728 are two parallel optional solutions, and either of the solutions may be performed.

S701. The terminal device sends the GUTI and registration type information of the terminal device in the operator network to the first AMF network element.

Correspondingly, the first AMF network element receives the GUTI and the registration type information of the terminal device in the operator network from the terminal device.

For example, the GUTI and the registration type information of the terminal device in the operator network may be carried in a registration request message. The registration type information is used to indicate to request mobility-type registration (mobility registration update).

The GUTI of the terminal device in the operator network includes a PLMN ID field. The first AMF network element may determine, based on the PLMN ID field, that the terminal device is of an operator type. The first AMF network element queries, based on the GUTI of the terminal device in the operator network, whether a mapping between the GUTI of the terminal device in the operator network and a GUTI of the terminal device in the enterprise network exists locally. If the mapping does not exist locally, a process of S702 to S715 in which the first AMF network element requests the SUPI of the terminal device in the enterprise network is performed. If the mapping exists locally, a process of S716 to S728 in which the first AMF network element requests the SUPI of the terminal device in the operator network from the second AMF network element, and obtains, through local mapping, the SUPI of the terminal device in the enterprise network is performed.

S702. The first AMF network element sends an identity request message to the terminal device.

Correspondingly, the terminal device receives the identity request message from the first AMF network element. The identity request message includes indication information, and the indication information is used to request the SUPI of the terminal device in the enterprise network.

S703. The terminal device sends the SUPI of the terminal device in the enterprise network to the first AMF network element.

Correspondingly, the first AMF network element receives the SUPI of the terminal device in the enterprise network from the terminal device. For example, the SUPI of the terminal device in the enterprise network may be carried in an identity response message.

Steps S704 to S715 are the same as steps S602 to S613, and are not repeated herein.

S716. The first AMF network element sends identification information of the first AMF network element to the second AMF network element.

Correspondingly, the second AMF network element receives the identification information of the first AMF network element from the first AMF network element.

For example, the identification information of the first AMF network element may be carried in a terminal device context request message (for example, Namf_Communication_UEContextTransfer Request). The terminal device context request message is used to request the SUPI of the terminal device in the operator network.

S717. The second AMF network element sends the SUPI of the terminal device in the operator network to the first AMF network element.

The second AMF network element may determine, based on the identification information of the first AMF network element in the terminal device context request message, that the terminal device context request message comes from the first AMF network element. The second AMF network element may send a part of terminal device context information to the first AMF network element according to a local policy. For example, the part of terminal device context information may not include a security context, but include the SUPI, a permanent device identifier, a registration area, and the like of the terminal device in the operator network.

Correspondingly, the first AMF network element receives the SUPI of the terminal device in the operator network from the second AMF network element. For example, the part of terminal device context information may be carried in a terminal device context response message (for example, Namf_Communication_UEContextTransfer Response).

S718. The first AMF network element requests the first UDM network element to set up context information of the terminal device.

For this step, refer to related descriptions of step S603. Details are not repeated herein.

S719. The first AMF network element sends the SUPI of the terminal device in the operator network to the first UDM network element.

Correspondingly, the first UDM network element receives the SUPI of the terminal device in the operator network from the first AMF network element.

For example, the SUPI of the terminal device in the operator network may be carried in an enterprise network subscription information obtaining request message (for example, Nudm_SDM_Get Request). The message is used to request subscription information of the terminal device in the enterprise network. The subscription information includes the SUPI of the terminal device in the enterprise network that corresponds to the SUPI of the terminal device in the operator network. The SUPI of the terminal device in the operator network is unencrypted identification information of the terminal device in the operator network.

S720. The first UDM network element searches a database for the SUPI of the terminal device in the enterprise network that corresponds to the SUPI of the terminal device in the operator network, and sends the SUPI of the terminal device in the enterprise network to the first AMF network element.

Correspondingly, the first AMF network element receives, from the first UDM network element, the SUPI of the terminal device in the enterprise network that corresponds to the SUPI of the terminal device in the operator network. The SUPI of the terminal device in the enterprise network may be carried in the subscription information of the terminal device in the enterprise network. The subscription information of the terminal device in the enterprise network may be carried in an enterprise network subscription information obtaining response message (for example, Nudm_SDM_Get Response).

If the first AMF network element receives the SUPI of the terminal device in the enterprise network, the first AMF network element determines that the SUPI of the terminal device in the enterprise network can be used to register with the operator network, and steps S721 to S728 are performed, where steps S721 to S728 are the same as steps S606 to S613, and are not repeated herein. Otherwise, the first AMF network element rejects a registration request of the terminal device.

According to the communication method provided in this embodiment of this application, when a terminal device that has previously registered with an operator network moves into an enterprise network, an AMF network element in the enterprise network obtains identification information of the terminal device in the enterprise network. There may be the following two manners: 1. As described in step S702, the AMF network element in the enterprise network requests an SUCI of the terminal device in the enterprise network from the terminal device. 2. As described in steps S716 and S717, the AMF network element in the enterprise network requests an SUPI of the terminal device in the operator network from an AMF network element in the operator network. In this way, the terminal device does not need to perceive a difference between the enterprise network and the operator network, and therefore can be compatible with an implementation of an existing terminal device.

This application further provides a communication method, used in the following scenario: A terminal device in a deregistered state (RM-DEREGISTERED state) in an operator network initiates initial registration in an enterprise network.

The communication method may correspond to the communication method shown in FIG. 5B, in which the first network is the enterprise network, and the second network is the operator network; the first AMF network element is an AMF network element in the enterprise network, and the second AMF network element is an AMF network element in the operator network; a first UDM network element is a UDM network element in the enterprise network, and a second UDM network element is a UDM network element in the operator network. The first identification information of the terminal device is an SUPI of the terminal device in the enterprise network, and the SUPI is unencrypted identification information of the terminal device in the enterprise network. The second identification information of the terminal device includes an SUPI of the terminal device in the operator network and an SUCI of the terminal device in the operator network. The SUPI is unencrypted identification information of the terminal device in the operator network. The SUCI is encrypted identification information of the terminal device in the operator network.

Referring to FIG. 8, the communication method includes S801 to S814. Details are as follows.

S801. The terminal device sends the SUCI of the terminal device in the operator network to the first AMF network element.

Correspondingly, the first AMF network element receives the SUCI of the terminal device in the operator network from the terminal device.

For example, the SUCI of the terminal device in the operator network may be carried in a registration request message.

The SUCI of the terminal device in the operator network includes a PLMN ID field. The first AMF network element may determine, based on the PLMN ID field, that the terminal device is of an operator type.

Steps S802 to S814 are the same as steps S716 to S728, and are not repeated herein.

According to the communication method provided in this embodiment of this application, the terminal device does not need to perceive a difference between the enterprise network and the operator network, but may access the enterprise network in a manner that is the same as an existing access manner, and therefore can be compatible with an implementation of an existing terminal device.

This application further provides a communication method, used in the following scenario: A terminal device performs initial registration in both an operator network and an enterprise network, and provides an operator network identifier and an enterprise network identifier.

The communication method may correspond to the communication method shown in FIG. 5C, in which the first network is the enterprise network, and the second network is the operator network; the first AMF network element is an AMF network element in the enterprise network, and the second AMF network element is an AMF network element in the operator network; a first SMF network element is an SMF network element in the enterprise network, and a second SMF network element is an SMF network element in the operator network; the first AUSF network element is an AUSF network element in the enterprise network, and the second AUSF network element is an AUSF network element in the operator network. The authentication vector of the terminal device in the first network is an authentication vector of the terminal device in the enterprise network. The authentication vector of the terminal device in the second network is an authentication vector of the terminal device in the operator network. The first identification information of the terminal device is an SUCI of the terminal device in the enterprise network, and the SUCI is encrypted identification information of the terminal device in the enterprise network. The second identification information of the terminal device is an SUCI of the terminal device in the operator network, and the SUCI is encrypted identification information of the terminal device in the operator network.

Figure 9A:
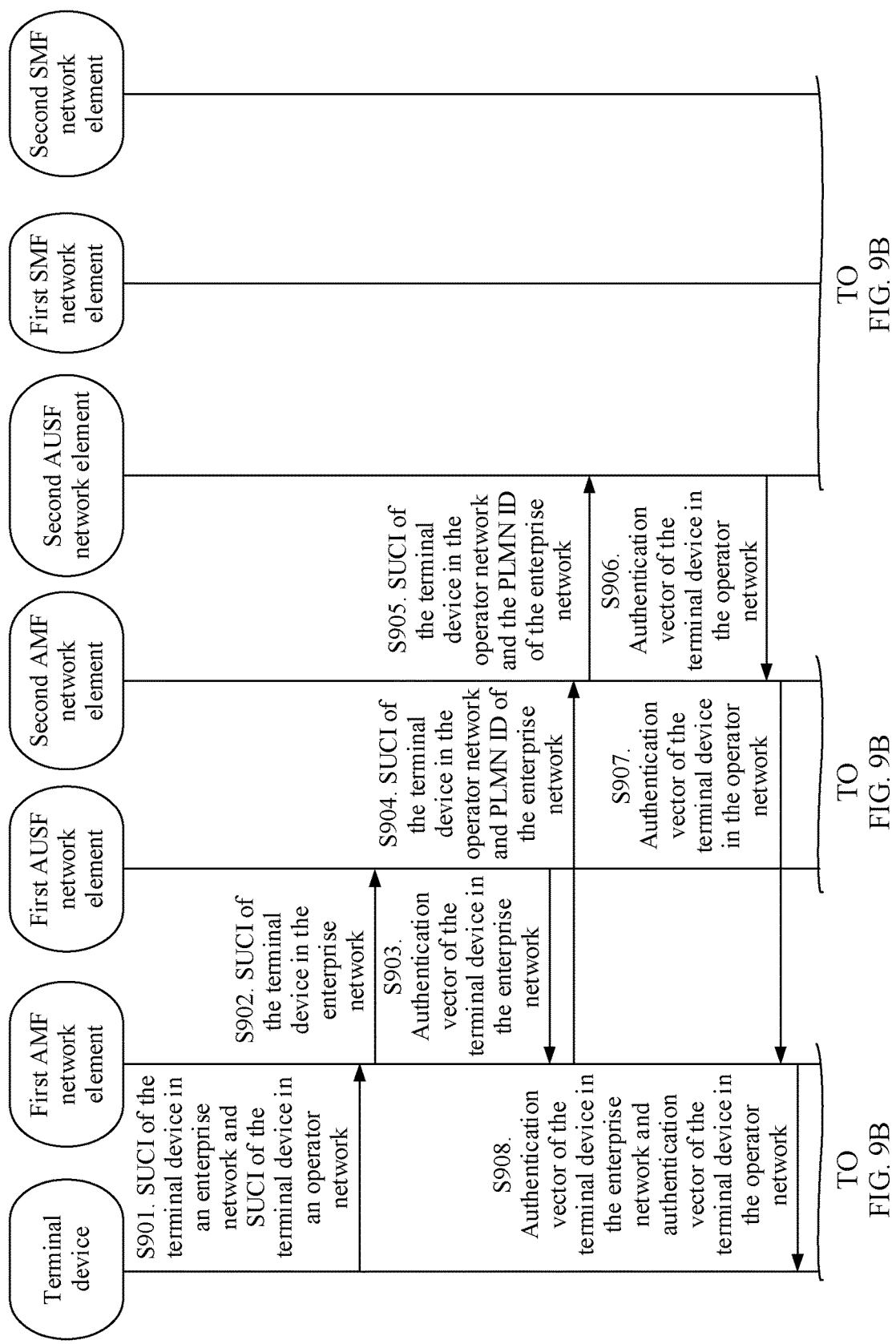
Figure 9C:
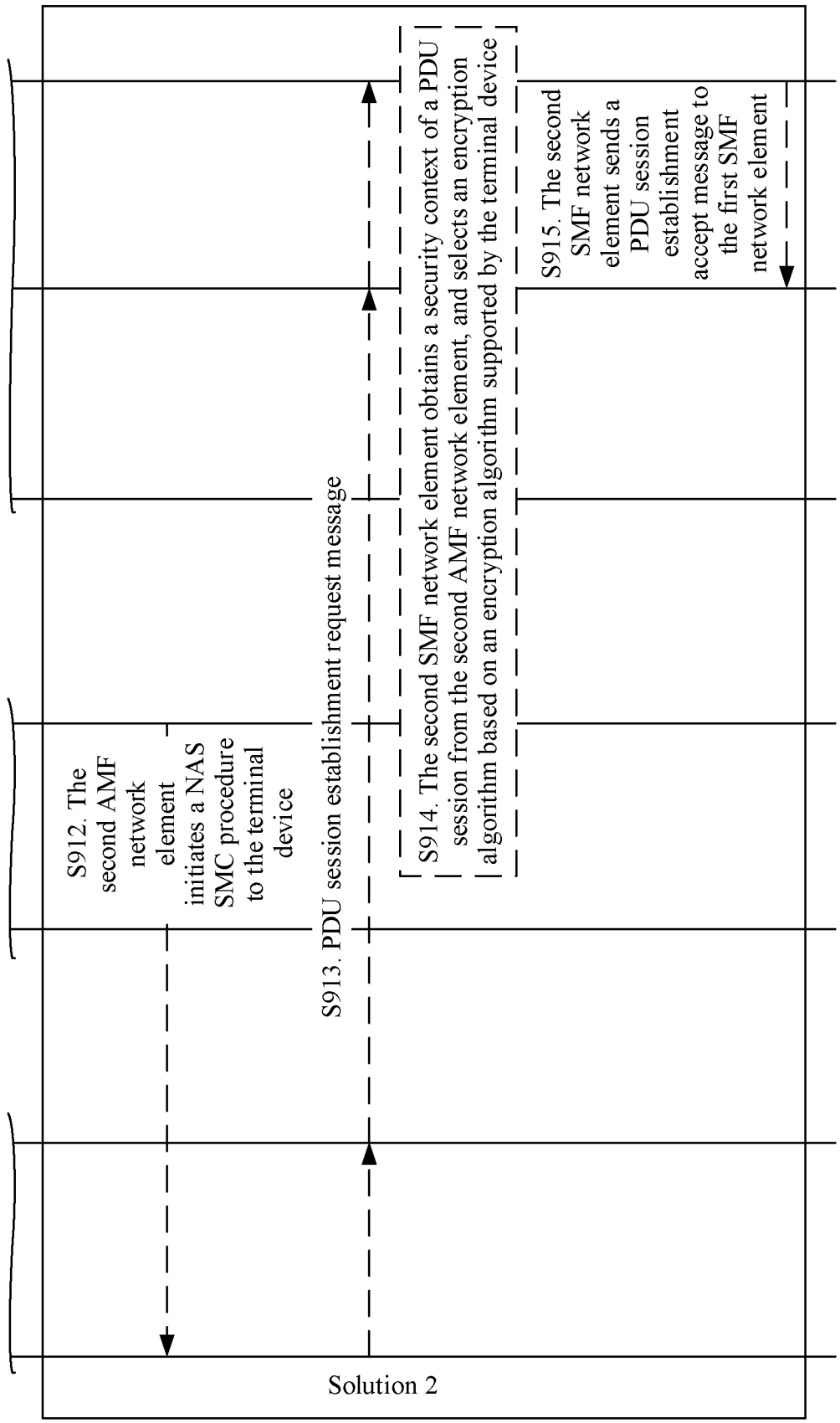

Referring to FIG. 9A to FIG. 9C, the communication method includes steps S901 to S915. Step S911 and steps S912 to S915 are two parallel optional solutions, and either of the solutions may be performed. Details are as follows.

S901. The terminal device sends the SUCI of the terminal device in the enterprise network and the SUCI of the terminal device in the operator network to the first AMF network element.

Correspondingly, the first AMF network element receives the SUCI of the terminal device in the enterprise network and the SUCI of the terminal device in the operator network from the terminal device.

The SUCI of the terminal device in the enterprise network and the SUCI of the terminal device in the operator network may be carried in one NAS message, for example, a registration request message, or may be carried in different NAS messages.

For example, a NAS message between the terminal device and the first AMF network element (that is, a NAS part or a NAS container between the terminal device and the first AMF network element) includes the SUCI of the terminal device in the enterprise network. A NAS message between the terminal device and the second AMF network element (that is, a NAS part or a NAS container between the terminal device and the second AMF network element) includes the SUCI of the terminal device in the operator network. Further, the NAS message between the terminal device and the first AMF network element and the NAS message between the terminal device and the second AMF network element may be carried in one message.

S902. The first AMF network element sends the SUCI of the terminal device in the enterprise network to the first AUSF network element.

For example, the SUCI of the terminal device in the enterprise network may be carried in an authentication vector request message. The authentication vector request message is used to request the authentication vector of the terminal device in the enterprise network from the second AUSF network element.

S903. The second AUSF network element generates the authentication vector of the terminal device in the enterprise network based on the SUCI of the terminal device in the enterprise network, and sends the authentication vector of the terminal device in the enterprise network to the second AMF network element.

Correspondingly, the second AMF network element receives the authentication vector of the terminal device in the enterprise network from the first AUSF network element.

The authentication vector of the terminal device in the enterprise network may include parameters such as a first random number (RAND), a first authentication token (AUTN), and a first key $K_{ASME}$*.

S904. The first AMF network element sends the SUCI of the terminal device in the operator network and a PLMN ID of the enterprise network to the second AMF network element.

Correspondingly, the second AMF network element receives the SUCI of the terminal device in the operator network and the PLMN ID of the enterprise network from the first AMF network element.

The SUCI of the terminal device in the operator network includes a mobile network code (MNC) of the operator network. The second AMF network element is an AMF network element in the operator network corresponding to the MNC in the SUCI of the terminal device in the operator network.

The SUCI of the terminal device in the operator network and the PLMN ID of the enterprise network in step S904 may be carried in a NAS message, and the NAS message may be a registration request message.

For example, when the SUCI of the terminal device in the enterprise network and the SUCI of the terminal device in the operator network in step S901 are carried in one NAS message, the NAS message in step S904 may be generated based on the NAS message in step S901. When the SUCI of the terminal device in the enterprise network and the SUCI of the terminal device in the operator network in step S901 are carried in different NAS messages, the NAS message may be the NAS message between the terminal device and the second AMF network element in step S901.

S905. The second AMF network element sends the SUCI of the terminal device in the operator network and the PLMN ID of the enterprise network to the second AUSF network element.

For example, the SUCI of the terminal device in the operator network and the PLMN ID of the enterprise network may be carried in an authentication vector request message. The authentication vector request message is used to request the authentication vector of the terminal device in the operator network from the second AUSF network element.

S906. The second AUSF network element generates the authentication vector of the terminal device in the operator network based on the SUCI of the terminal device in the operator network and the PLMN ID of the enterprise network, and sends the authentication vector of the terminal device in the operator network to the second AMF network element.

Correspondingly, the second AMF network element receives the authentication vector of the terminal device in the operator network from the second AUSF network element.

The authentication vector of the terminal device in the operator network may include parameters such as a second random number (RAND), a second authentication token (AUTN), and a second key $K_{ASME}^*$.

In addition, the authentication vector of the terminal device in the operator network may be carried in a 5G-authentication initiation answer (AIA) message.

S907. The second AMF network element sends the authentication vector of the terminal device in the operator network to the first AMF network element.

For example, the authentication vector of the terminal device in the operator network may be carried in a 5G-AIA message.

S908. The first AMF network element sends the authentication vector of the terminal device in the enterprise network and the authentication vector of the terminal device in the operator network to the terminal device.

Correspondingly, the terminal device receives the authentication vector of the terminal device in the enterprise network and the authentication vector of the terminal device in the operator network from the first AMF network element.

For example, the authentication vector of the terminal device in the enterprise network and the authentication vector of the terminal device in the operator network may be both carried in an authentication request (Auth-Req) message.

S909. The terminal device sends a target authentication vector of the terminal device in the enterprise network and a target authentication vector of the terminal device in the operator network to the first AMF network element.

Correspondingly, the first AMF network element receives the target authentication vector of the terminal device in the enterprise network and the target authentication vector of the terminal device in the operator network from the terminal device.

The target authentication vector of the terminal device in the enterprise network may be an authentication vector selected from the received authentication vector of the terminal device in the enterprise network by the terminal device for use by the terminal device. The target authentication vector of the terminal device in the operator network may be an authentication vector selected from the received authentication vectors of the terminal device in the operator network by the terminal device for use by the terminal device.

For example, the target authentication vector of the terminal device in the enterprise network and the target authentication vector of the terminal device in the operator network may be both carried in an authentication response (Auth-Resp) message.

S910. The first AMF network element sends the target authentication vector of the terminal device in the operator network to the second AMF network element.

Correspondingly, the second AMF network element receives the target authentication vector of the terminal device in the operator network from the first AMF network element.

S911. The second AMF network element sends the target authentication vector of the terminal device in the operator network to the second AUSF network element.

For example, the target authentication vector of the terminal device in the operator network may be carried in a 5G-authentication confirmation (AC) message.

Then session management (SM) security of the terminal device may be implemented in two manners. As described in step S912, the second AMF network element may initiate a NAS SMC procedure. Alternatively, as described in steps S913 to S915, when establishing a packet data unit (PDU) session, the terminal device uses an encryption algorithm supported by the terminal device as an information element and adds the information element to a PDU session establishment request message.

S912. The second AMF network element initiates a NAS security mode command (SMC) procedure to the terminal device.

In this step, the terminal device successfully establishes a security context with the second AMF network element.

S913. When establishing the PDU session, the terminal device sends the PDU session establishment request message to the second SMF network element by using the first AMF network element and the first SMF network element.

Correspondingly, the second SMF network element receives the PDU session establishment request message from the terminal device by using the first SMF network element and the first AMF network element.

The PDU session establishment request message may be used to request to establish the PDU session, and the message may include the encryption algorithm supported by the terminal device.

S914. The second SMF network element obtains the security context of the PDU session from the second AMF network element, and selects an encryption algorithm based on the encryption algorithm supported by the terminal device.

When performing communication through the operator network, the terminal device may perform encryption by using the encryption algorithm selected by the second SMF network element.

S915. The second SMF network element sends a PDU session establishment accept message to the first SMF network element.

According to the communication method provided in this embodiment of this application, the terminal device provides both registration information for the operator network and registration information for the enterprise network. The two pieces of registration information may be included in one NAS message, or may be included in two separate NAS messages. In addition, when sending an authentication vector to the terminal device, the AMF network element in the enterprise network may send the authentication vector of the terminal device in the operator network and the authentication vector of the terminal device in the enterprise network.

This application further provides a communication method. A network key of a terminal device is used for encryption in both an operator network and an enterprise network. In this way, an AMF network element in the enterprise network does not need to generate a separate encryption algorithm for the terminal device, thereby reducing implementation complexity.

The first network is the enterprise network, and the second network is the operator network. The first AMF network element is the AMF network element in the enterprise network, and the second AMF network element is an AMF network element in the operator network. The first AUSF network element is an AUSF network element in the enterprise network, and the second AUSF network element is an AUSF network element in the operator network. The second identification information of the terminal device is an SUCI of the terminal device in the operator network, and the SUCI is encrypted identification information of the terminal device in the operator network.

Figure 10:
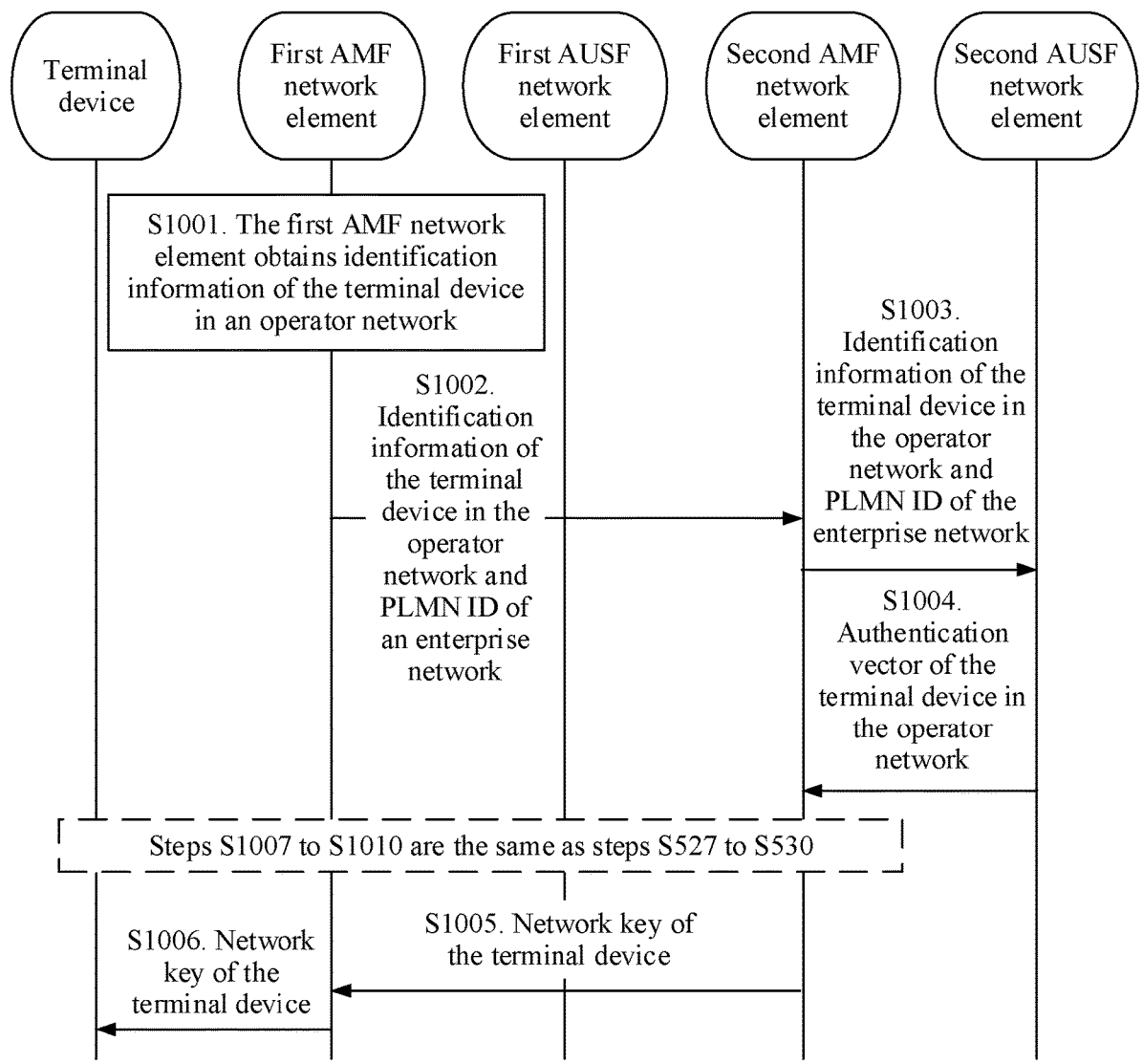
FIG. 10 is a schematic flowchart of a communication method according to an embodiment of this application.

Referring to FIG. 10, the communication method includes steps S1001 to S1010, which are described as follows.

S1001. The first AMF network element obtains identification information of the terminal device in the operator network.

In a possible implementation, the terminal device may send the identification information of the terminal device in the operator network to the first AMF network element. Correspondingly, the first AMF network element receives the identification information of the terminal device in the operator network from the terminal device. For example, the identification information may be an SUCI or an SUPI.

For example, the identification information of the terminal device in the operator network may be carried in a registration request message. The registration request message may be a NAS message.

In another possible implementation, the first AMF network element may obtain the identification information of the terminal device in the operator network based on identification information of the terminal device in the enterprise network. For details, refer to related descriptions of step S502.

S1002. The first AMF network element sends the identification information of the terminal device in the operator network and a PLMN ID of the enterprise network to the second AMF network element.

Correspondingly, the second AMF network element receives the identification information of the terminal device in the operator network and the PLMN ID of the enterprise network.

S1003. The second AMF network element sends the identification information of the terminal device in the operator network and the PLMN ID of the enterprise network to the second AUSF network element.

S1004. The second AUSF network element generates an authentication vector of the terminal device in the operator network based on the identification information of the terminal device in the operator network and the PLMN ID of the enterprise network, and sends the authentication vector of the terminal device in the operator network to the second AMF network element.

It should be noted that, when the identification information is the SUCI, steps S1002 to S1004 are the same as steps S904 to S906; or when the identification information is the SUPI, a difference between steps S1002 to S1004 and steps S904 to S906 lies in that the SUCI in steps S904 to S906 is replaced with the SUPI, and other content is the same, and is not repeated herein.

In addition, the second AUSF network element further stores an element used for authentication, for example, XRES*.

Optionally, the method further includes steps S1007 to S1010. For S1007 to S1010, refer to steps S527 to S530 in the embodiment shown in FIG. 5C. Specifically, the first network in S527 to S530 is replaced with the enterprise network, and the second network is replaced with the operator network. Details are not described again.

Further, optionally, after the terminal device successfully authenticates the enterprise network and the operator network, and the enterprise network and the operator network successfully authenticate the terminal device (that is, steps S1007 to S1010), step S1005 is performed.

Optionally, the method further includes: The terminal device performs authentication on the operator network. Specifically, the second AMF network element sends the authentication vector of the terminal device in the second network to the first AMF network element, the first AMF network element sends the authentication vector of the terminal device in the second network to the terminal device, the terminal device sends a target authentication vector of the terminal device in the second network to the first AMF network element, and the first AMF network element sends the target authentication vector of the terminal device in the second network to the second AMF network element. After the terminal device successfully authenticates the operator network, and the operator network successfully authenticates the terminal device, step S1005 is performed. In this case, authentication performed by the terminal device on the enterprise network and authentication performed by the enterprise network on the terminal device may be performed after step S1005. This is not limited. For the foregoing actions, refer to related descriptions in the embodiment shown in FIG. 5C. Details are not described again.

S1005. The second AMF network element sends the network key of the terminal device to the first AMF network element.

Correspondingly, the first AMF network element receives the network key of the terminal device from the second AMF network element.

Step S1005 may include: The second AMF network element determines the network key of the terminal device based on a local policy configuration.

In a possible implementation, the network key of the terminal device is carried in an independent message. In this case, the network key of the terminal device may include:

a security anchor key $K_{SEAF}$, where the first AMF network element may generate information such as $K_{AMF}$ based on $K_{SEAF}$;

a mobility management function key $K_{AMF}$, where the first AMF network element may generate corresponding information such as $K_{NASint}$ and $K_{NASenc}$ based on $K_{AMF}$, $K_{NASint}$ is a NAS integrity protection key, and $K_{NASenc}$ is a NAS encryption key; and an access security management function key $K_{ASME}^*$, where the first AMF network element may generate corresponding information such as $K_{NASint}$ and $K_{NASenc}$ based on $K_{ASME}^*$.

In another possible implementation, the network key of the terminal device may be carried in a registration accept message. In this case, the network key of the terminal device may include:

$K_{SEAF}$, where the first AMF network element may generate information such as $K_{AMF}$ based on $K_{SEAF}$;

$K_{AMF}$, where the first AMF network element may generate corresponding information such as $K_{NASint}$ and $K_{NASenc}$ based on $K_{AMF}$; and an access security management function key $K_{ASME}^{}$, where the first AMF network element may generate corresponding information such as $K_{NASint}$ and $K_{NASenc}$ based on $K_{ASME}^{}$.

Figure 11:
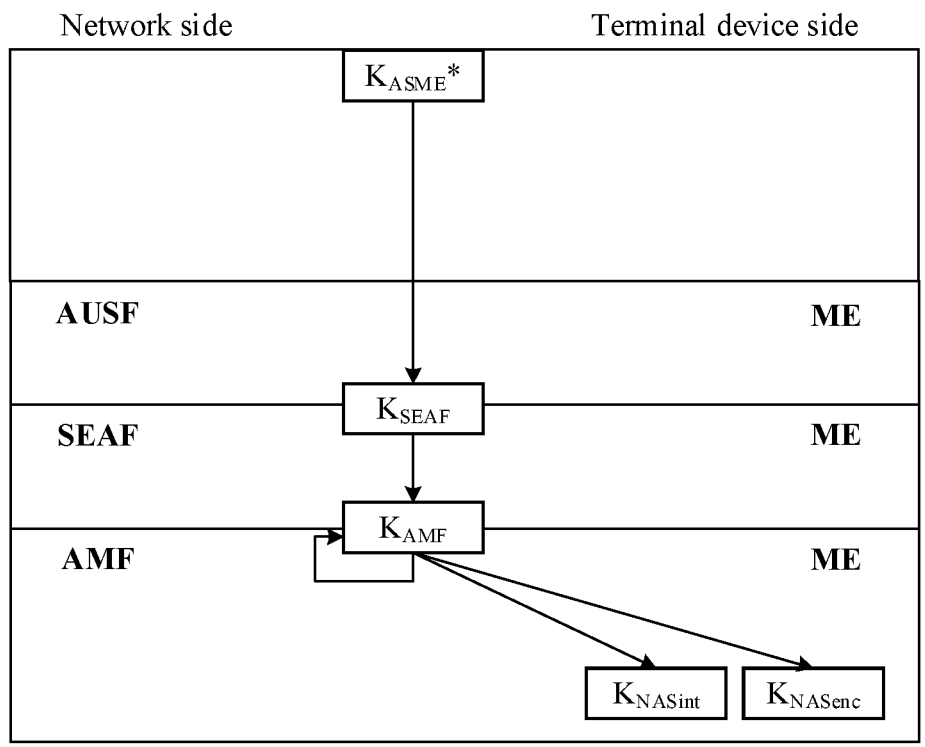
FIG. 11 is a schematic diagram of a network key according to an embodiment of this application.

FIG. 11 shows a relationship between the $K_{ASME}^*$, $K_{SEAF}$, $K_{AMF}$, $K_{NASint}$ and $K_{NASenc}$ keys. A mobile entity (ME) is a physical device obtained by removing a subscriber identification module (SIM) card from the terminal device.

S1006. The first AMF network element sends the network key of the terminal device to the terminal device.

Correspondingly, the terminal device receives the network key of the terminal device from the first AMF network element.

The network key in steps S1005 and S1006 may be used for security protection for both a message or data between the terminal device and the first network and a message or data between the terminal device and the second network.

According to the communication method provided in this embodiment of this application, the second AMF network element in the operator network sends the network key of the terminal device to the first AMF network element in the enterprise network. The network key is used for security protection for the message or the data between the terminal device and the first network and the message or the data between the terminal device and the second network. In this way, the AMF network element in the enterprise network does not need to generate a separate encryption algorithm for the terminal device, thereby reducing complexity.

An embodiment of this application further provides a communications apparatus, which may be configured to perform the functions of the first AMF network element in the foregoing methods. In this embodiment of this application, functional modules of the communications apparatus may be divided based on the foregoing method examples. For example, the functional modules may be divided based on the functions, or at least two functions may be integrated in one processing module. The integrated module may be implemented in a form of hardware, or may be implemented in a form of a software functional module. It should be noted that, in this application, division into the modules is an example, and is merely logical function division. In actual implementation, another division manner may be used.

Figure 12:
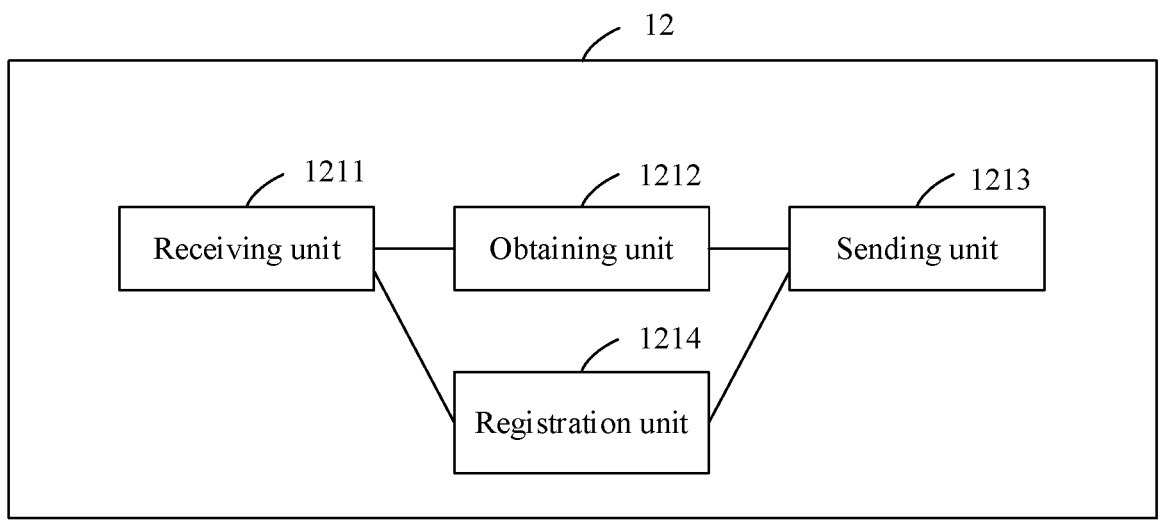
FIG. 12 is a schematic structural diagram of a communications apparatus according to an embodiment of this application.

When the functional modules are divided based on the functions, FIG. 12 is a possible schematic structural diagram of the communications apparatus in the foregoing embodiment. The communications apparatus 12 may include a receiving unit 1211, an obtaining unit 1212, a sending unit 1213, and a registration unit 1214. The foregoing units are configured to support the communications apparatus in performing a related method of the first AMF network element in any one of FIG. 5A to FIG. 10.

The communications apparatus provided in this application is configured to perform a corresponding method provided in the foregoing descriptions. Therefore, for a corresponding feature and a beneficial effect that can be achieved by the communications apparatus, refer to a beneficial effect of the corresponding method provided in the foregoing descriptions. Details are not described herein again.

It should be noted that the foregoing units are optional. For example, the communications apparatus 12 may include the receiving unit 1211, the obtaining unit 1212, and the sending unit 1213. Alternatively, the communications apparatus 12 may include the receiving unit 1211 and the sending unit 1213, and optionally, may further include the registration unit 1214.

For example, the receiving unit 1211 is configured to support the communications apparatus 12 in performing the processes S501 and S505 in FIG. 5A, or the processes S511, S515, and S517 in FIG. 5B, or the processes S521, S523, S527, and S529 in FIG. 5C, or the process S531 in FIG. 5D, or the processes S601, S602, S605, S611, and S613 in FIG. 6A-2, or the processes S6021, S6022, S6023, and S6024 in FIG. 6B, or the processes S6071 and S6072 in FIG. 6C, or the processes S701, S703, S704, S707, S713, S715, S717, S720, S726, and S728 in FIG. 7A and FIG. 7B, or the processes S801, S803, S806, S812, and S814 in FIG. 8, or the processes S901, S903, S907, S909, and S913 in FIG. 9A to FIG. 9C, or the processes S1005, S1007, and S1010 in FIG. 10. The obtaining unit 1212 is configured to support the communications apparatus 12 in performing the process S502 in FIG. 5A, or the process S602 in FIG. 6A-1, or the processes S6021 and S6026 in FIG. 6B, or the process S704 in FIG. 7A, or the process S1001 in FIG. 10. The sending unit 1213 is configured to support the communications apparatus 12 in performing the process S503 in FIG. 5A, or the process S512 in FIG. 5B, or the processes S522, S524, S528, and S530 in FIG. 5C, or the process S532 in FIG. 5D, or the processes S602 to S604, S606, and S612 in FIG. 6A-2, or the processes S6021, S6022, S6023, S6024, and S6025 in FIG. 6B, or the processes S702, S704 to S706, S708, S714, S716, S718, S719, S721, and S727 in FIG. 7A and FIG. 7B, or the processes S802, S804, S805, S807, and S813 in FIG. 8, or the processes S902, S904, S908, S910, and S913 in FIG. 9A to FIG. 9C, or the processes S1002, S1006, S1008, and S1009 in FIG. 10. The registration unit 1214 is configured to support the communications apparatus 12 in performing the process S516 in FIG. 5B. For function descriptions of corresponding functional modules, refer to all related content of the steps in the foregoing method embodiments. Details are not described herein again.

In a possible implementation, the communications apparatus is located in a first network, and the communications apparatus includes:

the receiving unit 1211, configured to receive a first message from a terminal device, where the first message is used to request to register the terminal device with the first network, the first message includes first identification information of the terminal device, and the first identification information is identification information of the terminal device in the first network;

the obtaining unit 1212, configured to obtain second identification information of the terminal device based on the first identification information, where the second identification information is identification information of the terminal device in a second network; and the sending unit 1213, configured to send a second message to a second access and mobility management function network element, where the second message is used to request to register the terminal device with the second network, the second message includes the second identification information, and the second access and mobility management function network element is located in the second network.

In a possible implementation, the obtaining unit 1212 is specifically configured to obtain, based on a preset correspondence between the first identification information and the second identification information, the second identification information corresponding to the first identification information.

In a possible implementation, the obtaining unit 1212 is specifically configured to obtain subscription information of the terminal device in the first network from the unified data management function network element in the first network. The subscription information includes the preset correspondence between the first identification information and the second identification information.

In a possible implementation, the sending unit 1213 is further configured to send the first identification information to the unified data management function network element in the first network, and the receiving unit 1211 is further configured to receive the second identification information from the unified data management function network element; or the sending unit 1213 is further configured to send the first identification information to an authentication server function network element in the first network, the receiving unit 1211 is further configured to receive third identification information corresponding to the first identification information from the authentication server function network element, the sending unit 1213 is further configured to send the third identification information to the unified data management function network element, and the receiving unit 1211 is further configured to receive the second identification information from the unified data management function network element.

In a possible implementation, the first message further includes first indication information, the first indication information is used to indicate whether to register the terminal device with the second network, and the sending unit 1213 is specifically configured to: when the first indication information indicates to register the terminal device with the second network, send the second message to the second access and mobility management function network element.

In a possible implementation, the receiving unit 1211 is further configured to receive a network key of the terminal device in the second network from the second access and mobility management function network element.

In a possible implementation, the communications apparatus is located in a first network, and the communications apparatus includes: the receiving unit 1211, configured to receive a first message from a terminal device, where the first message includes second identification information of the terminal device, and the second identification information is identification information of the terminal device in a second network; and the sending unit 1213, configured to send a second message to a second access and mobility management function network element, where the second message is used to request to register the terminal device with the second network, the second message includes the second identification information, and the second access and mobility management function network element is located in the second network.

In a possible implementation, the receiving unit 1211 is further configured to receive a network key of the terminal device in the second network from the second access and mobility management function network element.

In a possible implementation, the communications apparatus further includes the registration unit 1214. The receiving unit 1211 is further configured to receive first identification information of the terminal device from the second access and mobility management function network element, where the first identification information is identification information of the terminal device in the first network. The registration unit 1214 is configured to register the terminal device with the first network based on the first identification information.

In a possible implementation, the communications apparatus is located in a first network, and the communications apparatus includes: the receiving unit 1211, configured to receive a first registration message of a terminal device from the terminal device, where the first registration message is used to request to register the terminal device with the first network; and the sending unit 1213, configured to send a second registration message to a second access and mobility management function network element based on the first registration message, where the second access and mobility management function network element is located in a second network, and the second registration message is used to request to register the terminal device with the second network.

In a possible implementation, the sending unit 1213 is specifically configured to: when the first registration message carries first indication information, and the first indication information is used to indicate to register the terminal device with the second network, send the second registration message to the second access and mobility management function network element; or when the first registration message carries identification information of the terminal device in the second network, send the second registration message to the second access and mobility management function network element; or when the first registration message carries network identification information, and the network identification information is used to identify the second network, send the second registration message to the second access and mobility management function network element.

In a possible implementation, the communications apparatus is located in a first network, and the communications apparatus includes: the receiving unit 1211, configured to receive first identification information and second identification information of a terminal device from the terminal device, where the first identification information is identification information of the terminal device in the first network, and the second identification information is identification information of the terminal device in a second network; and the sending unit 1213, configured to send the first identification information to an authentication server function network element in the first network, where the first identification information is used to generate an authentication vector of the terminal device in the first network. The receiving unit 1211 is further configured to receive the authentication vector of the terminal device in the first network from the authentication server function network element. The sending unit 1213 is further configured to send the second identification information to a second access and mobility management function network element, where the second identification information is used to generate an authentication vector of the terminal device in the second network, and the second access and mobility management function network element is located in the second network. The receiving unit 1211 is further configured to receive the authentication vector of the terminal device in the second network from the second access and mobility management function network element. The sending unit 1213 is further configured to send the authentication vector of the terminal device in the first network and the authentication vector of the terminal device in the second network to the terminal device.

In a possible implementation, the first identification information includes a public land mobile network identifier of the first network, and the sending unit 1213 is further configured to send the public land mobile network identifier of the first network to the second access and mobility management function network element, where the public land mobile network identifier of the first network is used to generate the authentication vector of the terminal device in the second network.

In a possible implementation, the receiving unit 1211 is further configured to receive a target authentication vector of the terminal device in the first network and a target authentication vector of the terminal device in the second network from the terminal device, and the sending unit 1213 is further configured to send the target authentication vector of the terminal device in the second network to the second access and mobility management function network element.

In a possible implementation, the receiving unit 1211 is further configured to receive a network key of the terminal device from the second access and mobility management function network element.

Figure 13:
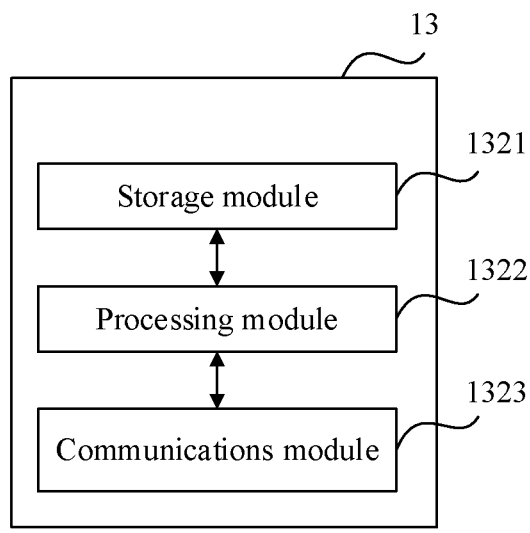
FIG. 13 is a schematic structural diagram of a communications apparatus according to an embodiment of this application.

FIG. 13 is another possible schematic structural diagram of the communications apparatus in the foregoing embodiment. The communications apparatus 13 includes a processing module 1322 and a communications module 1323. Optionally, the communications apparatus 13 may further include a storage module 1321. The foregoing modules are configured to support the communications apparatus in performing a related method of the first AMF network element in any one of FIG. 5A to FIG. 10.

The communications apparatus provided in this application is configured to perform a corresponding method provided in the foregoing descriptions. Therefore, for a corresponding feature and a beneficial effect that can be achieved by the communications apparatus, refer to a beneficial effect of the corresponding method provided in the foregoing descriptions. Details are not described herein again.

In a possible manner, the processing module 1322 is configured to control and manage an action of the communications apparatus 13 or perform a corresponding processing function, for example, perform the functions of the obtaining unit 1212 and the registration unit 1214. The communications module 1323 is configured to support the communications apparatus 13 in performing the functions of the receiving unit 1211 and the sending unit 1213. The storage module 1321 is configured to store program code and/or data of the communications apparatus.

The processing module 1322 may be a processor or a controller, for example, may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The processor may implement or perform various example logical blocks, modules, and circuits described with reference to content disclosed in this application. The processor may be a combination of processors implementing a computing function, for example, a combination of one or more microprocessors, or a combination of a DSP and a microprocessor. The communications module 1323 may be a network interface, a communications interface, or the like. The storage module 1321 may be a memory.

In a possible manner, the processing module 1322 may be the processor 301 in FIG. 3, the communications module 1323 may be the communications interface 303 in FIG. 3, and the storage module 1321 may be the memory 302 in FIG. 3. One or more programs are stored in the memory. The one or more programs include an instruction. When the instruction is executed by the communications apparatus, the communications apparatus is enabled to perform a related method of the first AMF network element in any one of FIG. 5A to FIG. 10.

An embodiment of this application further provides a computer storage medium that stores one or more programs. The computer storage medium stores a computer program. When the computer program is executed by a processor, a communications apparatus is enabled to perform a related method of the first AMF network element in any one of FIG. 5A to FIG. 10.

An embodiment of this application further provides a computer program product that includes an instruction. When the computer program product runs on a communications apparatus, the communications apparatus is enabled to perform a related method of the first AMF network element in any one of FIG. 5A to FIG. 10.

An embodiment of this application provides a chip system. The chip system includes a processor, configured to support a communications apparatus in performing a related method of the first AMF network element in any one of FIG. 5A to FIG. 10. For example, the first access and mobility management function network element receives a first message from a terminal device, where the first message is used to request to register the terminal device with a first network, the first message includes first identification information of the terminal device, the first access and mobility management function network element is located in the first network, and the first identification information is identification information of the terminal device in the first network; the first access and mobility management function network element obtains second identification information of the terminal device based on the first identification information, where the second identification information is identification information of the terminal device in a second network; and the first access and mobility management function network element sends a second message to a second access and mobility management function network element, where the second message is used to request to register the terminal device with the second network, the second message includes the second identification information, and the second access and mobility management function network element is located in the second network. In a possible implementation, the chip system further includes a memory. The memory is configured to store a program instruction and data that are necessary. The chip system may include a chip or an integrated circuit, or may include a chip and another discrete device. This is not specifically limited in this embodiment of this application.

The communications apparatus, the computer storage medium, the computer program product, and the chip system provided in this application are all configured to perform corresponding methods provided in the foregoing descriptions. Therefore, for beneficial effects that can be achieved by the communications apparatus, the computer storage medium, the computer program product, and the chip system, refer to beneficial effects of the corresponding methods provided in the foregoing descriptions. Details are not described herein again.

It can be understood that the communications apparatus may be the first AMF network element, or may be a component (a chip, a circuit, or the like) that may be used for the first AMF network element.

An embodiment of this application further provides a communications apparatus, which may be configured to perform the functions of the second AMF network element in the foregoing methods. In this embodiment of this application, functional modules of the communications apparatus may be divided based on the foregoing method examples. For example, the functional modules may be divided based on the functions, or at least two functions may be integrated in one processing module. The integrated module may be implemented in a form of hardware, or may be implemented in a form of a software functional module. It should be noted that, in this application, division into the modules is an example, and is merely logical function division. In actual implementation, another division manner may be used.

Figure 14:
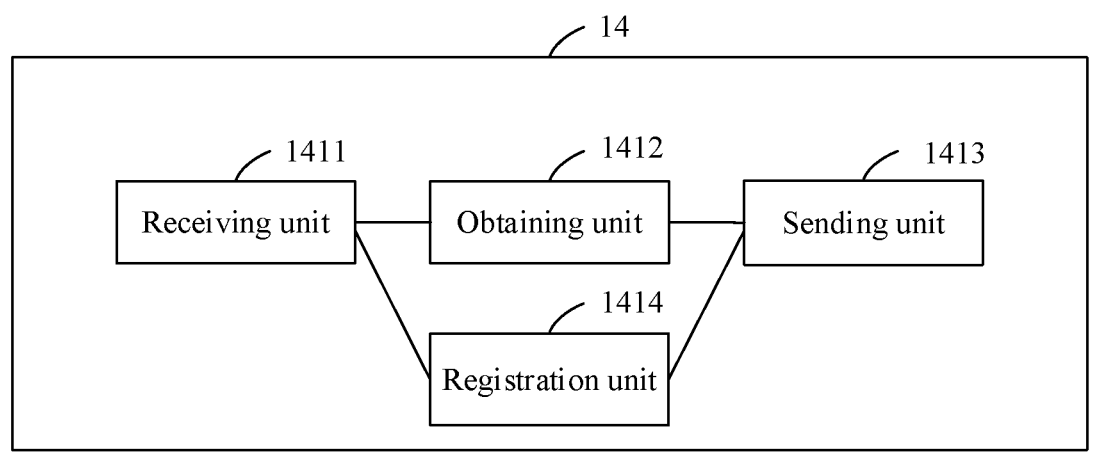
FIG. 14 is a schematic structural diagram of another communications apparatus according to an embodiment of this application.

When the functional modules are divided based on the functions, FIG. 14 is a possible schematic structural diagram of the communications apparatus in the foregoing embodiment. The communications apparatus 14 may include a receiving unit 1411, an obtaining unit 1412, a sending unit 1413, and a registration unit 1414. The foregoing units are configured to support the communications apparatus in performing a related method of the second AMF network element in any one of FIG. 5A to FIG. 10. The communications apparatus provided in this application is configured to perform a corresponding method provided in the foregoing descriptions. Therefore, for a corresponding feature and a beneficial effect that can be achieved by the communications apparatus, refer to a beneficial effect of the corresponding method provided in the foregoing descriptions. Details are not described herein again.

It should be noted that the foregoing units are optional. For example, the communications apparatus 14 may include the receiving unit 1411 and the registration unit 1414. Optionally, the communications apparatus 14 further includes the obtaining unit 1412 and the sending unit 1413. For another example, the communications apparatus 14 may include the receiving unit 1411 and the sending unit 1413.

For example, the receiving unit 1411 is configured to support the communications apparatus 14 in performing the process S503 in FIG. 5A, or the process S512 in FIG. 5B, or the processes S524, S526, and S530 in FIG. 5C, or the process S532 in FIG. 5D, or the processes S606, S607, and S610 in FIG. 6A-2, or the processes S6071 and S6072 in FIG. 6C, or the processes S708, S709, S712, S716, S721, S722, and S725 in FIG. 7A and FIG. 7B, or the processes S802, S807, S808, and S811 in FIG. 8, or the processes S904, S906, S910, and S914 in FIG. 9A to FIG. 9C, or the processes S1002, S1004, and S1010 in FIG. 10.

The obtaining unit 1412 is configured to support the communications apparatus 14 in performing the process S514 in FIG. 5B, or the process S607 in FIG. 6A-2, or the processes S6071 and S6073 in FIG. 6C, or the processes S709 and S712 in FIG. 7A.

The sending unit 1413 is configured to support the communications apparatus 14 in performing the processes S515 and S517 in FIG. 5B, or the processes S525 and S527 in FIG. 5C, or the processes S607 to S609 and S611 in FIG. 6A-2, or the processes S6071, S6072, and S6106 in FIG. 6C, or the processes S709 to S711, S713, S717, S712 to S714, and S726 in FIG. 7A and FIG. 7B, or the process S812 in FIG. 8, or the processes S905, S907, S911, S912, and S914 in FIG. 9A to FIG. 9C, or the processes S1003, S1005, and S1007 in FIG. 10.

The registration unit 1414 is configured to support the communications apparatus 14 in performing the process S504 in FIG. 5A, or the process S513 in FIG. 5B, or the process S533 in FIG. 5D.

For function descriptions of corresponding functional modules, refer to all related content of the steps in the foregoing method embodiments. Details are not described herein again.

In a possible implementation, the communications apparatus is located in a second network, and the communications apparatus includes: the receiving unit 1411, configured to receive a second message from a first access and mobility management function network element, where the first access and mobility management function network element is located in a first network, the second message is used to request to register a terminal device with the second network, the second message includes second identification information of the terminal device, and the second identification information is identification information of the terminal device in the second network; and the registration unit 1414, configured to register the terminal device with the second network based on the second identification information.

In a possible implementation, the communications apparatus further includes the obtaining unit 1412 and the sending unit 1413. The obtaining unit 1412 is configured to obtain first identification information of the terminal device based on the second identification information, where the first identification information is identification information of the terminal device in the first network. The sending unit 1413 is configured to send the first identification information to the first access and mobility management function network element.

In a possible implementation, the obtaining unit 1412 is specifically configured to obtain, based on a preset correspondence between the first identification information and the second identification information, the first identification information corresponding to the second identification information.

In a possible implementation, the obtaining unit 1412 is further configured to obtain subscription information of the terminal device in the second network from a unified data management function network element in the second network, where the subscription information includes the preset correspondence between the first identification information and the second identification information.

In a possible implementation, the sending unit 1413 is further configured to send the second identification information to the unified data management function network element in the second network, and the receiving unit 1411 is further configured to receive the first identification information from the unified data management function network element; or the sending unit 1413 is further configured to send the second identification information to an authentication server function network element in the second network, the receiving unit 1411 is further configured to receive fourth identification information corresponding to the second identification information from the authentication server function network element, the sending unit 1413 is further configured to send the fourth identification information to the unified data management function network element, and the receiving unit 1411 is further configured to receive the first identification information from the unified data management function network element.

In a possible implementation, the communications apparatus is located in a second network, and the communications apparatus includes: the receiving unit 1411, configured to receive second identification information of a terminal device from a first access and mobility management function network element, where the first access and mobility management function network element is located in a first network, and the second identification information is identification information of the terminal device in the second network; and the sending unit 1413, configured to send the second identification information to an authentication server function network element in the second network, where the second identification information is used to generate an authentication vector of the terminal device in the second network. The receiving unit 1411 is further configured to receive the authentication vector of the terminal device in the second network from the authentication server function network element. The sending unit 1413 is further configured to send the authentication vector of the terminal device in the second network to the first access and mobility management function network element.

In a possible implementation, the receiving unit 1411 is further configured to receive a public land mobile network identifier of the first network from the first access and mobility management function network element, and the sending unit 1413 is further configured to send the public land mobile network identifier of the first network to the authentication server function network element, where the public land mobile network identifier of the first network is used to generate the authentication vector of the terminal device in the second network.

Figure 15:
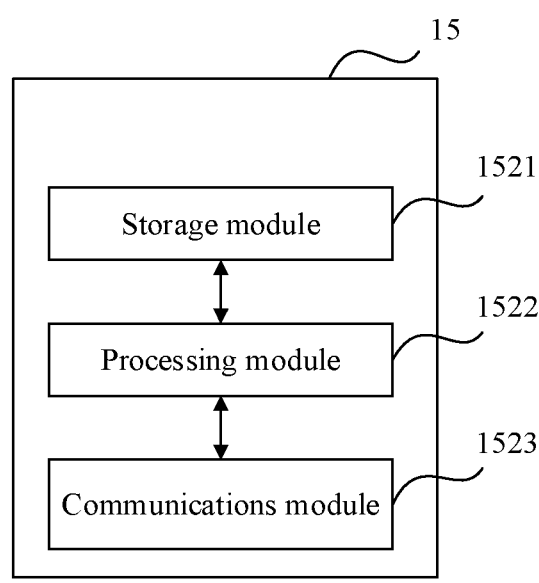
FIG. 15 is a schematic structural diagram of another communications apparatus according to an embodiment of this application.

FIG. 15 is another possible schematic structural diagram of the communications apparatus in the foregoing embodiment. The communications apparatus 15 includes a processing module 1522 and a communications module 1523. Optionally, the communications apparatus 15 may further include a storage module 1521. The foregoing modules are configured to support the communications apparatus in performing a related method of the second AMF network element in any one of FIG. 5A to FIG. 10. The communications apparatus provided in this application is configured to perform a corresponding method provided in the foregoing descriptions. Therefore, for a corresponding feature and a beneficial effect that can be achieved by the communications apparatus, refer to a beneficial effect of the corresponding method provided in the foregoing descriptions. Details are not described herein again.

In a possible manner, the processing module 1522 is configured to control and manage an action of the communications apparatus 15 or perform a corresponding processing function, for example, perform the functions of the obtaining unit 1412 and the registration unit 1414. The communications module 1523 is configured to support the communications apparatus 15 in performing the functions of the receiving unit 1411 and the sending unit 1413. The storage module 1521 is configured to store program code and/or data of the communications apparatus.

The processing module 1522 may be a processor or a controller, for example, may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The processor may implement or perform various example logical blocks, modules, and circuits described with reference to content disclosed in this application. The processor may be a combination of processors implementing a computing function, for example, a combination of one or more microprocessors, or a combination of a DSP and a microprocessor. The communications module 1523 may be a network interface, a communications interface, or the like. The storage module 1521 may be a memory.

In a possible manner, the processing module 1522 may be the processor 301 in FIG. 3, the communications module 1523 may be the communications interface 303 in FIG. 3, and the storage module 1521 may be the memory 302 in FIG. 3. One or more programs are stored in the memory. The one or more programs include instructions, where when the instructions are executed by the communications apparatus, the communications apparatus is enabled to perform a related method of the second AMF network element in any one of FIG. 5A to FIG. 10.

An embodiment of this application further provides a computer storage medium that stores one or more programs. The computer storage medium stores a computer program, where when the computer program is executed by a processor, a communications apparatus is enabled to perform a related method of the second AMF network element in any one of FIG. 5A to FIG. 10.

An embodiment of this application further provides a computer program product that includes an instruction, where when the computer program product runs on a communications apparatus, the communications apparatus is enabled to perform a related method of the second AMF network element in any one of FIG. 5A to FIG. 10.

An embodiment of this application provides a chip system. The chip system includes a processor, configured to support a communications apparatus in performing a related method of the second AMF network element in any one of FIG. 5A to FIG. 10. For example, the second access and mobility management function network element receives a second message from a first access and mobility management function network element, where the first access and mobility management function network element is located in a first network, the second access and mobility management function network element is located in a second network, the second message is used to request to register a terminal device with the second network, the second message includes second identification information of the terminal device, and the second identification information is identification information of the terminal device in the second network. The second access and mobility management function network element registers the terminal device with the second network based on the second identification information. In a possible implementation, the chip system further includes a memory. The memory is configured to store a program instruction and data that are necessary. The chip system may include a chip or an integrated circuit, or may include a chip and another discrete device. This is not specifically limited in this embodiment of this application.

The communications apparatus, the computer storage medium, the computer program product, and the chip system provided in this application are all configured to perform corresponding methods provided in the foregoing descriptions. Therefore, for beneficial effects that can be achieved by the communications apparatus, the computer storage medium, the computer program product, and the chip system, refer to beneficial effects of the corresponding methods provided in the foregoing descriptions. Details are not described herein again.

It can be understood that the communications apparatus may be the second AMF network element, or may be a component (a chip, a circuit, or the like) that may be used for the second AMF network element.

It should be understood that sequence numbers of the foregoing processes do not mean execution sequences in the embodiments of this application. The execution sequences of the processes should be determined based on functions and internal logic of the processes, and should not constitute any limitation on the implementation processes of the embodiments of this application.

A person of ordinary skill in the art may be aware that units, algorithms, and steps in the examples described with reference to the embodiments disclosed in this application can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, apparatus, and unit described above, refer to a corresponding process in the foregoing method embodiments. Details are not described herein again.

In the several embodiments provided in this application, it should be understood that the disclosed system, device, and method may be implemented in other manners. For example, the described device embodiments are merely examples. For example, division into the units is merely logical function division and may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objective of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
receiving, by a first access and mobility management function network element, a first message from a terminal device, wherein the first message comprises first identification information of the terminal device, wherein the first access and mobility management function network element is located in a first network, the first identification information is identification information of the terminal device in the first network, and the first message is used to request registration of the terminal device with the first network;
obtaining, by the first access and mobility management function network element, second identification information of the terminal device based on the first identification information, wherein the second identification information is identification information of the terminal device in a second network; and
sending, by the first access and mobility management function network element, a second message to a second access and mobility management function network element, wherein the second message comprises the second identification information, the second access and mobility management function network element is located in the second network, and the second message is used to request registration of the terminal device with the second network.

2. The communication method according to claim 1, wherein obtaining, by the first access and mobility management function network element, the second identification information of the terminal device based on the first identification information comprises:
obtaining, by the first access and mobility management function network element, the second identification information based on a preset correspondence between the first identification information and the second identification information.

3. The communication method according to claim 2, wherein the communication method further comprises:
   obtaining, by the first access and mobility management function network element, subscription information of the terminal device in the first network from a unified data management function network element in the first network, wherein the subscription information comprises the preset correspondence between the first identification information and the second identification information.

4. The communication method according to claim 1, wherein obtaining, by the first access and mobility management function network element, second identification information of the terminal device based on the first identification information comprises:
   sending, by the first access and mobility management function network element, the first identification information to a unified data management function network element in the first network, and receiving the second identification information from the unified data management function network element; or
   sending, by the first access and mobility management function network element, the first identification information to an authentication server function network element in the first network, receiving third identification information corresponding to the first identification information from the authentication server function network element, sending the third identification information to the unified data management function network element, and receiving the second identification information from the unified data management function network element.

5. The communication method according to claim 1, wherein the first message further comprises first indication information, the first indication information used to indicate whether to register the terminal device with the second network, and wherein sending, by the first access and mobility management function network element, the second message to the second access and mobility management function network element comprises:
   sending, by the first access and mobility management function network element, when the first indication information indicates registering the terminal device with the second network, the second message to the second access and mobility management function network element.

6. The communication method according to claim 1, wherein the communication method further comprises:
   receiving, by the first access and mobility management function network element, a network key of the terminal device in the second network from the second access and mobility management function network element.

7. The communication method according to claim 1, wherein the communication method further comprises:
   receiving, by the second access and mobility management function network element, the second message from the first access and mobility management function network element; and
   registering, by the second access and mobility management function network element, the terminal device with the second network based on the second identification information.

8. The communication method according to claim 7, wherein the communication method further comprises:
   obtaining, by the second access and mobility management function network element, first identification information of the terminal device based on the second identification information, wherein the first identification information is identification information of the terminal device in the first network; and
   sending, by the second access and mobility management function network element, the first identification information to the first access and mobility management function network element.

9. The communication method according to claim 8, wherein obtaining, by the second access and mobility management function network element, first identification information of the terminal device based on the second identification information comprises:
   obtaining, by the second access and mobility management function network element, the first identification information based on a preset correspondence between the first identification information and the second identification information.

10. A communication system, comprising: a first access and mobility management function network element located in a first network; and a second access and mobility management function network element located in a second network; wherein
    the first access and mobility management function network element is configured to receive a first message from a terminal device, wherein the first message comprises first identification information of the terminal device, the first identification information is identification information of the terminal device in a first network, and the first message is used request registration of the terminal device with the first network;
    obtain second identification information of the terminal device based on the first identification information, wherein the second identification information is identification information of the terminal device in the second network; and
    send a second message to the second access and mobility management function network element, wherein the second message comprises the second identification information, and the second message is used to request registration of the terminal device with the second network; and
    the second access and mobility management function network element is configured to receive the second message, and register the terminal device with the second network based on the second identification information.

11. The communication system according to claim 10, wherein the first access and mobility management function network element is further configured to:
    obtain the second identification information based on a preset correspondence between the first identification information and the second identification information.

12. The communication system according to claim 11, wherein the first access and mobility management function network element is further configured to:
    obtain subscription information of the terminal device in the first network from a unified data management function network element in the first network, wherein the subscription information comprises the preset correspondence between the first identification information and the second identification information.

13. The communication system according to claim 10, wherein the first access and mobility management function network element is further configured to:
    send the first identification information to a unified data management function network element in the first network, and receive the second identification information from the unified data management function network element; or send the first identification information to an authentication server function network element in the first network, receive third identification information corresponding to the first identification information from the authentication server function network element, send the third identification information to the unified data management function network element, and receive the second identification information from the unified data management function network element.

14. The communication system according to claim 10, wherein the first message further comprises first indication information, wherein the first indication information indicates whether to register the terminal device with the second network, and the first access and mobility management function network element is further configured to:

when the first indication information indicates to register the terminal device with the second network, send the second message to the second access and mobility management function network element.

15. The communication system according to claim 10, wherein the first access and mobility management function network element is further configured to:

receive a network key of the terminal device in the second network from the second access and mobility management function network element.

16. The communication system according to claim 10, wherein the second access and mobility management function network element is further configured to:

obtain first identification information of the terminal device based on the second identification information, wherein the first identification information is identification information of the terminal device in the first network; and send the first identification information to the first access and mobility management function network element.

17. The communication system according to claim 16, wherein the second access and mobility management function network element is further configured to:

obtain the first identification information based on a preset correspondence between the first identification information and the second identification information.

18. A communications apparatus located in a first network, the communications apparatus comprising a processor and a memory;

the memory configured to store a program, and the processor configured to invoke the program stored in the memory, to perform a method comprising:

receiving a first message from a terminal device, wherein the first message is used to request registration of the terminal device with the first network, wherein the first message comprises first identification information of the terminal device, and the first identification information is identification information of the terminal device in the first network;

obtaining second identification information of the terminal device based on the first identification information, wherein the second identification information is identification information of the terminal device in a second network; and sending a second message to a second access and mobility management function network element, wherein the second message is used to request registration of the terminal device with the second network, the second message comprises the second identification information, and the second access and mobility management function network element is located in the second network.

19. The communications apparatus according to claim 18, wherein the program stored in the memory, when invoked by the processor, is further configured to:

obtain the second identification information based on a preset correspondence between the first identification information and the second identification information.

20. The communications apparatus according to claim 18, wherein the program stored in the memory, when invoked by the processor, is further configured to:

send the first identification information to a unified data management function network element in the first network, and receive the second identification information from the unified data management function network element; or send the first identification information to an authentication server function network element in the first network, receive third identification information corresponding to the first identification information from the authentication server function network element, send the third identification information to the unified data management function network element, and receive the second identification information from the unified data management function network element.

\* \* \* \* \*

UNITED STATES PATENT AND TRADEMARK OFFICE
CERTIFICATE OF CORRECTION

PATENT NO. : 11,451,950 B2
APPLICATION NO. : 17/192256
DATED : September 20, 2022
INVENTOR(S) : Meng Li et al.

It is certified that error appears in the above-identified patent and that said Letters Patent is hereby corrected as shown below:

On the Title Page

Column 2, item [56], Line 2, delete "publicnetworks"," and insert -- public networks", --.

In the Claims

Column 56, Line 30, Claim 10, delete "used request" and insert -- used to request --.

Signed and Sealed this
First Day of November, 2022

Katherine Kelly Vidal
*Director of the United States Patent and Trademark Office*